(12) United States Patent
Yang et al.

(10) Patent No.: US 12,348,150 B2
(45) Date of Patent: Jul. 1, 2025

(54) CONTROLLERS AND METHODS FOR CONTROLLING TRANSISTORS BASED AT LEAST IN PART ON MODES OF OPERATION RELATED TO POWER CONVERTERS

(71) Applicant: ON-BRIGHT ELECTRONICS (SHANGHAI) CO., LTD., Shanghai (CN)

(72) Inventors: Penglin Yang, Shanghai (CN); Yaming Cao, Shanghai (CN); Yuan Lin, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 259 days.

(21) Appl. No.: 18/125,559

(22) Filed: Mar. 23, 2023

(65) Prior Publication Data

US 2023/0327570 A1 Oct. 12, 2023

(30) Foreign Application Priority Data

Mar. 23, 2022 (CN) .......................... 202210289552.3

(51) Int. Cl.
*H02M 3/335* (2006.01)
*H02M 1/00* (2006.01)
*H02M 1/38* (2007.01)

(52) U.S. Cl.
CPC ..... *H02M 3/33592* (2013.01); *H02M 1/0058* (2021.05); *H02M 1/385* (2021.05)

(58) Field of Classification Search
CPC ........... H02M 3/33592; H02M 1/0058; H02M 1/385; H02M 1/0032; H02M 1/38
See application file for complete search history.

(56) References Cited

U.S. PATENT DOCUMENTS 6,385,059 B1 5/2002 Telefus et al.
9,674,903 B2 6/2017 Moon et al.
(Continued)

FOREIGN PATENT DOCUMENTS

CN 103066855 A 4/2013
CN 107426874 A 12/2017
(Continued)

OTHER PUBLICATIONS

Taiwan Patent Office, Office Action mailed Nov. 10, 2023, in Application No. 112117187.
(Continued)

*Primary Examiner* — Adolf D Berhane
*Assistant Examiner* — Afework S Demisse
(74) *Attorney, Agent, or Firm* — Faegre Drinker Biddle & Reath LLP

(57) ABSTRACT

Controller and method for a power converter. For example, a controller for a power converter includes: a mode detector configured to determine a mode of operation for the power converter; a first gate driver configured to output a first drive voltage to a first transistor related to a first auxiliary winding coupled to a primary winding, a secondary winding, and a second auxiliary winding; a second gate driver configured to output a second drive voltage to a second transistor related to the primary winding; wherein the first gate driver is further configured to, if the mode of operation satisfies one or more first predetermined conditions, generate the first drive voltage so that the first transistor remains turned off during a switching cycle of the power converter.

27 Claims, 10 Drawing Sheets

(56) References Cited

U.S. PATENT DOCUMENTS

| | | | |
|---|---|---|---|
| 10,063,153 B2* | 8/2018 | Fang | H02M 3/33515 |
| 10,103,616 B1 | 10/2018 | Lin et al. | |
| 10,277,131 B2 | 4/2019 | Zhang et al. | |
| 11,205,950 B2* | 12/2021 | Lau | H02M 1/0006 |
| 11,451,155 B2* | 9/2022 | Ng | H02M 3/33569 |
| 2014/0133192 A1 | 5/2014 | Lin et al. | |
| 2014/0140109 A1 | 5/2014 | Valley | |
| 2019/0222131 A1 | 7/2019 | King | |
| 2020/0112241 A1 | 4/2020 | Wang et al. | |
| 2021/0006147 A1 | 1/2021 | Feldtkeller | |
| 2023/0283165 A1 | 9/2023 | Fang et al. | |
| 2023/0291315 A1 | 9/2023 | Yang et al. | |
| 2024/0313657 A1 | 9/2024 | Fang et al. | |
| 2024/0322695 A1 | 9/2024 | Fang et al. | |

FOREIGN PATENT DOCUMENTS

| | | |
|---|---|---|
| CN | 108809107 A | 11/2018 |
| CN | 211237683 U | 8/2020 |
| CN | 113193758 A | 7/2021 |
| CN | 113708631 A | 11/2021 |
| CN | 113992018 A | 1/2022 |
| CN | 115224951 A | 10/2022 |
| CN | 115360918 A | 11/2022 |
| CN | 115694145 A | 2/2023 |
| JP | 2016-042765 A | 3/2016 |
| TW | 201603444 A | 1/2016 |
| TW | 201926877 A | 7/2019 |
| TW | 202008703 A | 2/2020 |
| TW | 202201891 A | 1/2022 |
| TW | M623787 U | 2/2022 |
| TW | 202230940 A | 8/2022 |

OTHER PUBLICATIONS

Taiwan Patent Office, Office Action mailed Nov. 10, 2023, in Application No. 112117188.
Taiwan Patent Office, Office Action mailed Nov. 16, 2023, in Application No. 111123512.
Taiwan Patent Office, Office Action mailed Oct. 23, 2023, in Application No. 111122734.
Taiwan Patent Office, Office Action mailed Sep. 12, 2023, in Application No. 111126161.
United States Patent and Trademark Office, Notice of Allowance mailed Jan. 7, 2025, in U.S. Appl. No. 18/111,853.
United States Patent and Trademark Office, Notice of Allowance mailed Mar. 21, 2025, in U.S. Appl. No. 18/118,003.

* cited by examiner

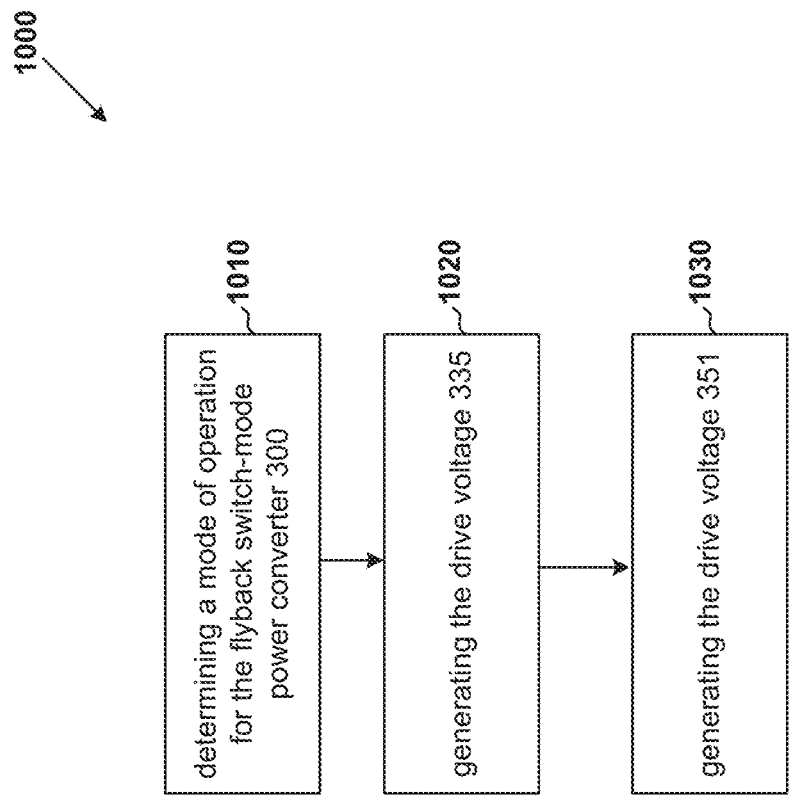

CONTROLLERS AND METHODS FOR CONTROLLING TRANSISTORS BASED AT LEAST IN PART ON MODES OF OPERATION RELATED TO POWER CONVERTERS

1. CROSS-REFERENCES TO RELATED APPLICATIONS

This application claims priority to Chinese Patent Application No. 202210289552.3, filed Mar. 23, 2022, incorporated by reference herein for all purposes.

2. BACKGROUND OF THE INVENTION

Certain embodiments of the present invention are directed to circuits. More particularly, some embodiments of the invention provide controllers and methods for controlling transistors based at least in part on modes of operation related to power converters. Merely by way of example, some embodiments of the invention have been applied to flyback switch-mode power converters. But it would be recognized that the invention has a much broader range of applicability.

The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level. The power converters include linear converters and switch-mode converters. The switch-mode converters often are implemented with various architectures, such as the fly-back architecture, the buck architecture, and/or the boost architecture. Fly-back switch-mode power converters, especially ones with low-voltage switching and/or zero-voltage switching (ZVS), are often used as power supply devices because of their small size, high frequency, and/or high power density.

FIG. 1 is a simplified diagram showing a conventional flyback switch-mode power converter with zero-voltage switching. The flyback switch-mode power converter 100 includes a primary winding 112, a secondary winding 114, auxiliary windings 116 and 118, a controller chip 120, resistors 140, 142 and 144, transistors 150, 160 and 280, a capacitor 162, an error amplification and isolation unit 172, and a synchronous rectification controller 290. For example, the controller chip 120 includes resistors 180 and 182, a diode 132, an oscillator 134, a comparator 136, a flip flop 138, an on-time controller 170, a dead-time controller 174, and gate drivers 176 and 178. As an example, the controller chip 120 also includes terminals 122, 124, 126, and 128 (e.g., pins). In some examples, the transistor 150 includes a parasitic capacitor 152. In certain examples, the primary winding 112, the secondary winding 114, and the auxiliary windings 116 and 118 are parts of a transformer.

The transistor 150 includes a drain terminal 154, a gate terminal 156, and a source terminal 158, and the transistor 160 includes a drain terminal 164, a gate terminal 166, and a source terminal 168. The gate driver 178 of the controller chip 120 generates a drive voltage 151, and the gate driver 176 of the controller chip 120 generates a drive voltage 135. The drive voltage 151 is received by the gate terminal 156 of the transistor 150, and the drive voltage 135 is received by the gate terminal 166 of the transistor 160. If the drive voltage 151 is at the logic high level, the transistor 150 is turned on, and if the drive voltage 151 is at the logic low level, the transistor 150 is turned off. If the drive voltage 135 is at the logic high level, the transistor 160 is turned on, and if the drive voltage 135 is at the logic low level, the transistor 160 is turned off.

Also, the transistor 280 includes a drain terminal 282, a gate terminal 284, and a source terminal 286. The synchronous rectification controller 290 includes two terminals 292 and 294. The terminal 292 is connected to the drain terminal 282 of the transistor 280, and the terminal 294 is connected to the gate terminal 284 of the transistor 280. The resistors 140 and 142 generate a voltage 141. The error amplification and isolation unit 172 receives an output voltage 192 and generates a feedback signal 173 based at least in part on the output voltage 192. The flyback switch-mode power converter 100 regulates the output voltage 192 at a constant value, and the feedback signal 173 represents an output current 193 (e.g., an output load). The feedback signal 173 is received by the diode 132.

As shown in FIG. 1, the flyback switch-mode power converter 100 receives an AC input voltage 190 and generates the output voltage 192. Additionally, a current 113 flows through the primary winding 112. Moreover, a current 163 flows through the auxiliary winding 118. Also, the primary winding 112 receives a voltage 115. The capacitor 162 includes terminals 194 and 196.

The on-time controller 170 receives a signal 171 and generates a control signal 177 based at least in part on the signal 171. If the signal 171 changes from a logic low level to a logic high level, the control signal 177 also changes from the logic low level to the logic high level in order to turn on the transistor 160. For example, the time duration when the control signal 177 remains at the logic high level (e.g., the time duration when the transistor 160 remains turned on) has a predetermined length. As an example, the time duration when the control signal 177 remains at the logic high level (e.g., the time duration when the transistor 160 remains turned on) is determined based on the voltage 115. The control signal 177 indicates the length of the time duration when the transistor 160 remains turned on. The control signal 177 is received by the dead-time controller 174 and the gate driver 176. The gate driver 176 generates the drive voltage 135 to turn on and/or turn off the transistor 160 based at least in part on the control signal 177.

The dead-time controller 174 receives the control signal 177 and generates a dead-time signal 175 based at least in part on the control signal 177. For example, the dead-time signal 175 represents a delay from the time when the drive voltage 135 changes from a logic high level to a logic low level to the time when the drive voltage 151 changes from the logic low level to the logic high level (e.g., a delay from the time when transistor 160 becomes tuned off to the time when the transistor 150 becomes turned on). The dead-time signal 175 is received by the oscillator 134, which also receives a voltage 181 that is generated by the resistors 180 and 182.

The resistor 180 is connected to the diode 132 and the resistor 182, and the resistors 180 and 182 output the voltage 181 to the oscillator 134 and the comparator 136. The comparator 136 also receives a voltage 145 that is generates by the resistor 144 connected to the source terminal 158 of the transistor 150. In response, the comparator 136 generates a comparison signal 137, which is received by the flip flop 138.

The oscillator 134 receives the dead-time signal 175 and the voltage 181 and generates the signal 171 and a signal 143 based at least in part on the dead-time signal 175 and the voltage 181. The signal 143 is received by the flip flop 138, which also receives the comparison signal 137 from the comparator 136 and generates a signal 139 based at least in part on the signal 143 and the comparison signal 137. The signal 139 is received by the gate driver 178, which in response generates the drive voltage 151 to turn on and/or turn off the transistor 150.

FIG. 2 shows simplified timing diagrams for the conventional fly-back switch-mode power converter 100 as shown in FIG. 1. The waveform 210 represents the voltage drop from the drain terminal 154 to the source terminal 158 of the transistor 150 as a function of time, the waveform 213 represents the current 113 as a function of time, the waveform 263 represents the current 163 as a function of time, the waveform 251 represents the drive voltage 151 as a function of time, and the waveform 235 represents the drive voltage 135 as a function of time. The voltage drop from the drain terminal 154 to the source terminal 158 of the transistor 150 is equal to the voltage at the drain terminal 154 minus the voltage at the source terminal 158.

From time $t_0$ to time $t_1$, the drive voltage 151 remains at a logic high level, and the transistor 150 remains turned on as shown by the waveform 251. Also, from time $t_0$ to time $t_1$, the voltage drop from the drain terminal 154 to the source terminal 158 of the transistor 150 remains equal to zero volts as shown by the waveform 210, and the current 113 that flows from the primary winding 112 to the transistor 150 increases from zero to a positive current value 220 as shown by the waveform 213. Additionally, from time $t_0$ to time $t_1$, the drive voltage 135 remains at a logic low level, and the transistor 160 remains turned off as shown by the waveform 235. Moreover, the current 163 remains equal to zero as shown by the waveform 263.

At time $t_1$, the drive voltage 151 changes from the logic high level to a logic low level, and the transistor 150 becomes turned off as shown by the waveform 251. Also, at time $t_1$, the primary winding 112 starts undergoing a demagnetization process as shown by the waveform 210. Additionally, at time $t_1$, the current 113 that flows from the primary winding 112 to the transistor 150 drops from the positive current value 220 to zero as shown by the waveform 213. Moreover, at time $t_1$, the drive voltage 135 remains at the logic low level, and the transistor 160 remains turned off as shown by the waveform 235. Also, at time $t_1$, the current 163 that flows from the auxiliary winding 118 to the capacitor 162 without going through the transistor 160 rises from zero to a positive current value 230 as shown by the waveform 263, and the capacitor 162 is charged by the current 163. Additionally, at time $t_1$, the transistor 280 is turned on by the synchronous rectification controller 290.

From time $t_1$ to time $t_2$, the drive voltage 151 remains at the logic low level, and the transistor 150 remains turned off as shown by the waveform 251. Also, from time $t_1$ to time $t_2$, the primary winding 112 undergoes the demagnetization process as shown by the waveform 210, and the current 113 remains equal to zero as shown by the waveform 213. Additionally, from time $t_1$ to time $t_2$, the drive voltage 135 remains at the logic low level, and the transistor 160 remains turned off as shown by the waveform 235. Moreover, from time $t_1$ to time $t_2$, the current 163 that flows from the auxiliary winding 118 to the capacitor 162 without going through the transistor 160 drops from the current value 230 to zero as shown by the waveform 263.

At time $t_2$, the current 163 that flows from the auxiliary winding 118 to the capacitor 162 without going through the transistor 160 is equal to zero as shown by the waveform 263. Also, at time $t_2$, the voltage drop from the terminal 194 to the terminal 196 of the capacitor 162 is determines as follows:

$$V_{162} = \frac{N_{s3}}{N_{s1}} \times V_{out} \qquad \text{(Equation 1)}$$

where $V_{162}$ represents the voltage drop from the terminal 194 to the terminal 196 of the capacitor 162, and $V_{out}$ represents the output voltage 192. Also, $N_{s1}$ represents the number of turns for the secondary winding 114, and $N_{s3}$ represents the number of turns for the auxiliary winding 118.

From time $t_2$ to time $t_3$, the drive voltage 151 remains at the logic low level, and the transistor 150 remains turned off as shown by the waveform 251. Also, from time $t_2$ to time $t_3$, the primary winding 112 undergoes the demagnetization process as shown by the waveform 210, and the current 113 remains equal to zero as shown by the waveform 213. Additionally, from time $t_2$ to time $t_3$, the drive voltage 135 remains at the logic low level, and the transistor 160 remains turned off as shown by the waveform 235. Moreover, from time $t_2$ to time $t_3$, the current 163 remains equal to zero as shown by the waveform 263.

At time $t_3$, the demagnetization process of the primary winding 112 ends as shown by the waveform 210. Also, at time $t_3$, the drive voltage 151 remains at the logic low level, and the transistor 150 remains turned off as shown by the waveform 251. Additionally, at time $t_3$, the drive voltage 135 remains at the logic low level, and the transistor 160 remains turned off as shown by the waveform 235. Moreover, at time $t_3$, the current 113 remains equal to zero as shown by the waveform 213, and the current 163 remains equal to zero as shown by the waveform 263.

From time $t_3$ to time $t_4$, the parasitic capacitor 152 and the primary winding 112 undergo a resonance process, and during the resonance process, the voltage drop from the drain terminal 154 to the source terminal 158 of the transistor 150 drops to a voltage value 244 as shown by the waveform 210. Also, from time $t_3$ to time $t_4$, the drive voltage 151 remains at the logic low level, and the transistor 150 remains turned off as shown by the waveform 251. Additionally, from time $t_3$ to time $t_4$, the drive voltage 135 remains at the logic low level, and the transistor 160 remains turned off as shown by the waveform 235. Moreover, from time $t_3$ to time $t_4$, the current 113 remains equal to zero as shown by the waveform 213, and the current 163 remains equal to zero as shown by the waveform 263.

At time $t_4$, the drive voltage 135 changes from the logic low level to the logic high level, and the transistor 160 becomes turned on as shown by the waveform 235. Also, at time 14, the current 163 starts flowing from the capacitor 162 to the transistor 160 through the auxiliary winding 118, and the capacitor 162 is discharged by the current 163.

From time $t_4$ to time $t_5$, the drive voltage 135 remains at the logic high level, and the transistor 160 remains turned on as shown by the waveform 235. For example, the transistor 160 remains turned on for a time duration $T_{on}$, which is equal to time $t_5$ minus time $t_4$. As an example, the length of the time duration $T_{on}$ is determined by the on-time controller 170 based at least in part on the voltage 115. Also, from time $t_4$ to time $t_5$, the current 163 flows from the capacitor 162 to the transistor 160 through the auxiliary winding 118, and the current 163 decreases from zero to a negative current value 232 as shown by the waveform 263. Additionally, from time $t_4$ to time $t_5$, the drive voltage 151 remains at the logic low level, and the transistor 150 remains turned off as shown by the waveform 251. Moreover, from time $t_4$ to time $t_5$, the current 113 remains equal to zero as shown by the waveform 213. Also, from time $t_4$ to time $t_5$, the voltage drop from the drain terminal 154 to the source terminal 158 of the transistor 150 is clamped at a voltage value 242 as shown by the waveform 210. For example, the voltage value 242 is determined as follows.

$$V_{242} = V_{bulk} + \frac{N_{S1}}{N_p} \times V_{out} \qquad \text{(Equation 2)}$$

where $V_{242}$ represents the voltage value 242. Additionally, $V_{bulk}$ represents the voltage 115, and $V_{out}$ represents the output voltage 192. Also, $N_{s1}$ represents the number of turns for the secondary winding 114, and $N_p$ represents the number of turns for the primary winding 112.

At time $t_5$, the drive voltage 135 changes from the logic high level to the logic low level, and the transistor 160 becomes turned off as shown by the waveform 235. Also, at time $t_5$, the current 163 that flows from the capacitor 162 to the transistor 160 through the auxiliary winding 118 increases from the negative current value 232 to zero as shown by the waveform 263. Additionally, at time $t_5$, the current 113 that flows from the transistor 150 to the primary winding 112 decreases from zero to a negative current value 222 as shown by the waveform 213. Moreover, at time $t_5$, the drive voltage 151 remains at the logic low level, and the transistor 150 remains turned off as shown by the waveform 251.

From time $t_5$ to time $t_6$, the drive voltage 135 remains at the logic low level, and the transistor 160 remains turned off as shown by the waveform 235. Also, from time $t_5$ to time $t_6$, the drive voltage 151 remains at the logic low level, and the transistor 150 remains turned off as shown by the waveform 251. For example, from time $t_5$ to time $t_6$, both the transistors 150 and 160 remain turned off for a time duration $T_{dead}$, which is equal to time $t_6$ minus time $t_5$. Additionally, from time $t_5$ to time $t_6$, the current 113 that flows from the transistor 150 to the primary winding 112 increases from the negative current value 222 to zero as shown by the waveform 213. Moreover, from time $t_5$ to time $t_6$, the current 163 remains equal to zero as shown by the waveform 263, and the parasitic capacitor 152 and the primary winding 112 undergo a resonance process as shown by the waveform 210. As an example, the time duration from time $t_5$ to time $t_6$ has a predetermined length (e.g., 400 ns).

At time $t_6$, the drive voltage 151 changes from the logic low level to the logic high level, and the transistor 150 becomes turned on as shown by the waveform 251. Also, at time $t_6$, the current 113 remains equal to zero as shown by the waveform 213, and the current 163 remains equal to zero as shown by the waveform 263. Additionally, at time $t_6$, immediately before the transistor 150 becomes tuned on, the voltage drop from the drain terminal 154 to the source terminal 158 of the transistor 150 is equal to a voltage value 240 as shown by the waveform 210. For example, the voltage value 240 is smaller than the voltage value 244. As an example, the voltage value 240 is approximately equal to zero volts. Moreover, at time $t_6$, the drive voltage 135 remains at the logic low level, and the transistor 160 remains turned off as shown by the waveform 235.

Hence it is highly desirable to improve the technique for switch-mode power converters.

3. BRIEF SUMMARY OF THE INVENTION

Certain embodiments of the present invention are directed to circuits. More particularly, some embodiments of the invention provide controllers and methods for controlling transistors based at least in part on modes of operation related to power converters. Merely by way of example, some embodiments of the invention have been applied to flyback switch-mode power converters. But it would be recognized that the invention has a much broader range of applicability.

According to certain embodiments, a controller for a power converter includes: a mode detector configured to determine a mode of operation for the power converter; a first gate driver configured to output a first drive voltage to a first transistor related to a first auxiliary winding coupled to a primary winding, a secondary winding, and a second auxiliary winding; a second gate driver configured to output a second drive voltage to a second transistor related to the primary winding; wherein the first gate driver is further configured to, if the mode of operation satisfies one or more first predetermined conditions, generate the first drive voltage so that the first transistor remains turned off during a switching cycle of the power converter; and if the mode of operation satisfies one or more second predetermined conditions, generate the first drive voltage so that the first transistor becomes turned on during the switching cycle of the power converter.

According to some embodiments, a controller for a power converter includes: a mode detector configured to determine a mode of operation for the power converter; a first gate driver configured to output a first drive voltage to a first transistor related to an auxiliary winding coupled to a primary winding and a secondary winding; and a second gate driver configured to output a second drive voltage to a second transistor related to the primary winding; wherein the first gate driver is further configured to, if the mode of operation satisfies one or more first predetermined conditions, generate the first drive voltage so that the first transistor remains turned off during every switching cycle of the power converter; and if the mode of operation satisfies one or more second predetermined conditions, generate the first drive voltage so that the first transistor becomes turned on during every switching cycle of the power converter; wherein the mode detector is further configured to: determine whether the power converter operates in a discontinuous conduction mode or a continuous conduction mode; determine whether or not the power converter operates in a light load mode; and determine whether the power converter operates in a high AC voltage mode or a low AC voltage mode.

According to certain embodiments, a method for a power converter includes: determining a mode of operation for the power converter; outputting a first drive voltage to a first transistor related to a first auxiliary winding coupled to a primary winding, a secondary winding, and a second auxiliary winding; and outputting a second drive voltage to a second transistor related to the primary winding; wherein the outputting a first drive voltage to a first transistor includes: if the mode of operation satisfies one or more first predetermined conditions, generating the first drive voltage so that the first transistor remains turned off during a switching cycle of the power converter; and if the mode of operation satisfies one or more second predetermined conditions, generating the first drive voltage so that the first transistor becomes turned on during the switching cycle of the power converter.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 10 is a simplified diagram showing a method for the flyback switch-mode power converter as shown in FIG. 3 according to certain embodiments of the present invention.

5. DETAILED DESCRIPTION OF THE INVENTION

Certain embodiments of the present invention are directed to circuits. More particularly, some embodiments of the invention provide controllers and methods for controlling transistors based at least in part on modes of operation related to power converters. Merely by way of example, some embodiments of the invention have been applied to flyback switch-mode power converters. But it would be recognized that the invention has a much broader range of applicability.

Figure 1:
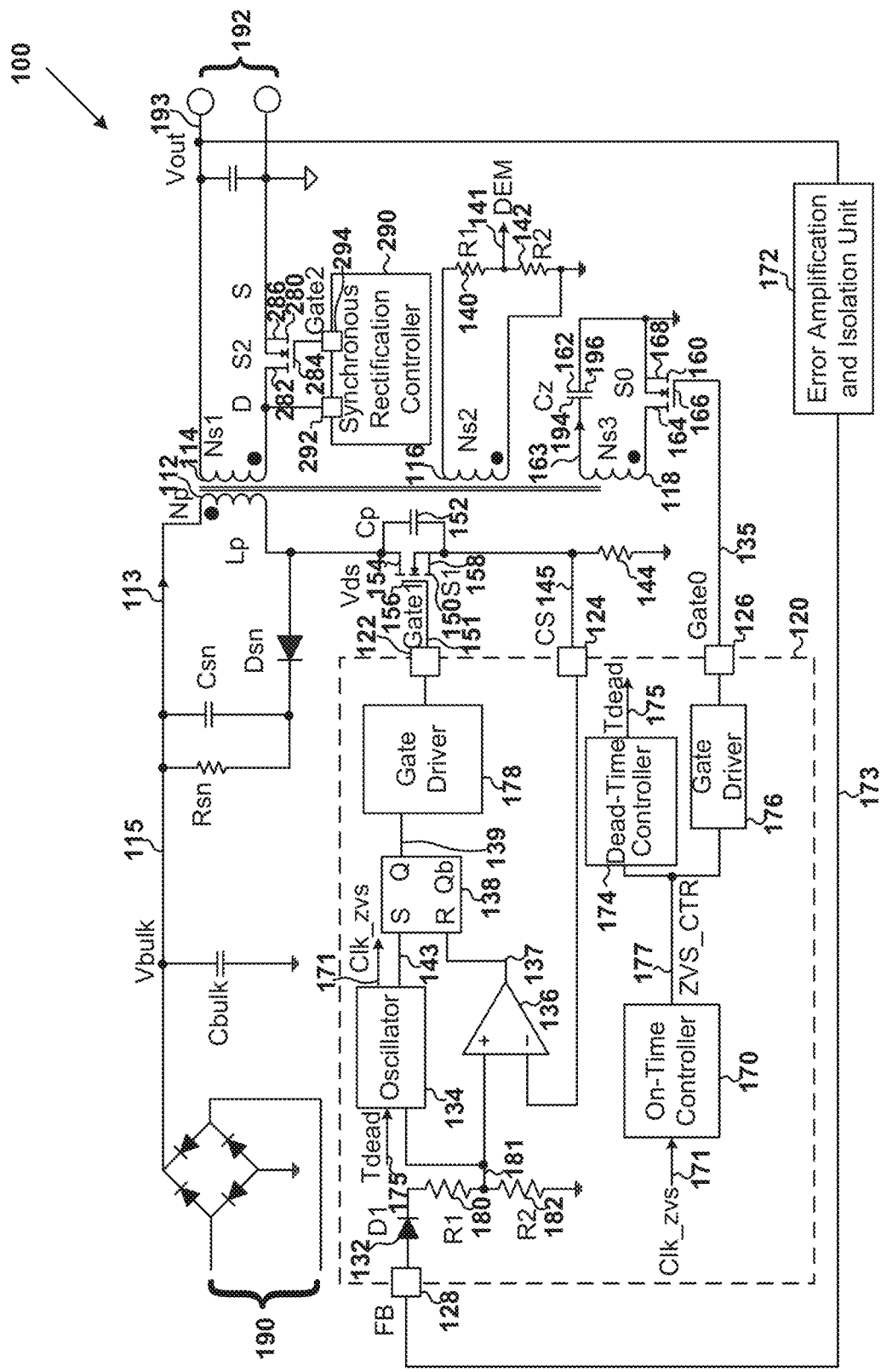
FIG. 1 is a simplified diagram showing a conventional flyback switch-mode power converter with zero-voltage switching.
Figure 2:
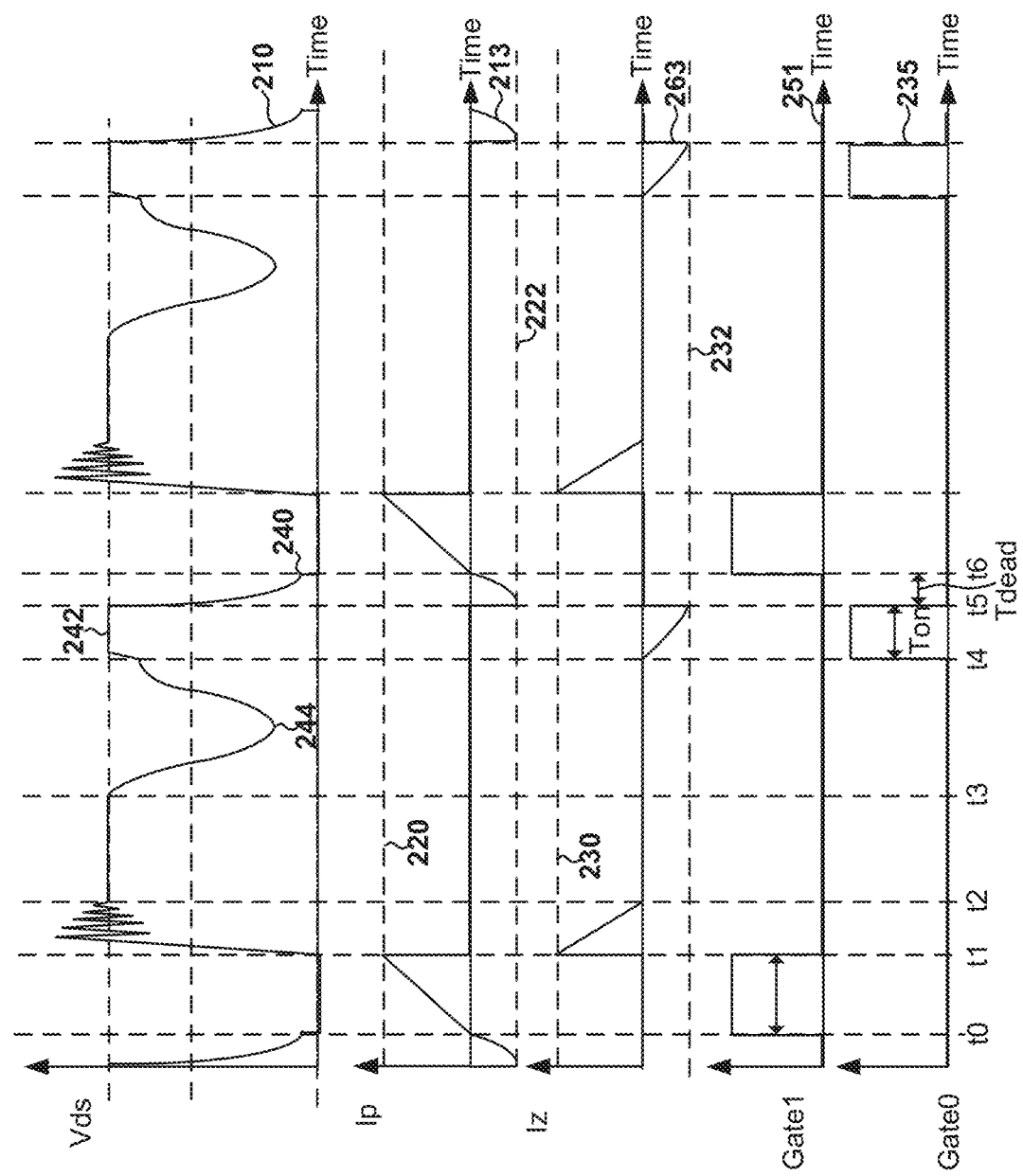
FIG. 2 shows simplified timing diagrams for the conventional fly-back switch-mode power converter as shown in FIG. 1.

As shown in FIG. 1 and FIG. 2, the length of the time duration $T_{on}$ when the transistor 160 remains turned on and the magnitude of the voltage drop from the terminal 194 to the terminal 196 of the capacitor 162 at time $t_2$ according to Equation 1 determine the demagnetization energy according to some embodiments. In certain examples, the higher the demagnetization energy, the lower the voltage value 240 for the voltage drop from the drain terminal 154 to the source terminal 158 of the transistor 150, which can further reduce the switching loss and improve the electromagnetic interference (EMI) performance of the flyback switch-mode power converter 100 according to some embodiments.

According to certain embodiments, as shown in FIG. 1 and FIG. 2, the controller chip 120 turns on the transistor 160 for each switching cycle regardless of the mode of operation for the flyback switch-mode power converter 100. For example, if the flyback switch-mode power converter 100 operates in a light load mode (LLM), turning on the transistor 160 for each switching cycle causes a high operating current, thus increasing the standby power consumption and/or the light-load power consumption. As an example, if the flyback switch-mode power converter 100 operates in a continuous conduction mode (CCM), when the transistor 160 becomes turned off, the synchronous rectification controller 290 mistakenly detects a rising edge of a voltage at the drain terminal 282 and in response, turns off the transistor 280 too early, thus generating a high peak value for a voltage difference from the drain terminal 282 to the source terminal 286 of the transistor 280 and also causing the temperature of the transistor 150 to rise and the efficiency of the flyback switch-mode power converter 100 to decrease, especially if the flyback switch-mode power converter 100 operates at a high switching frequency.

Figure 3:
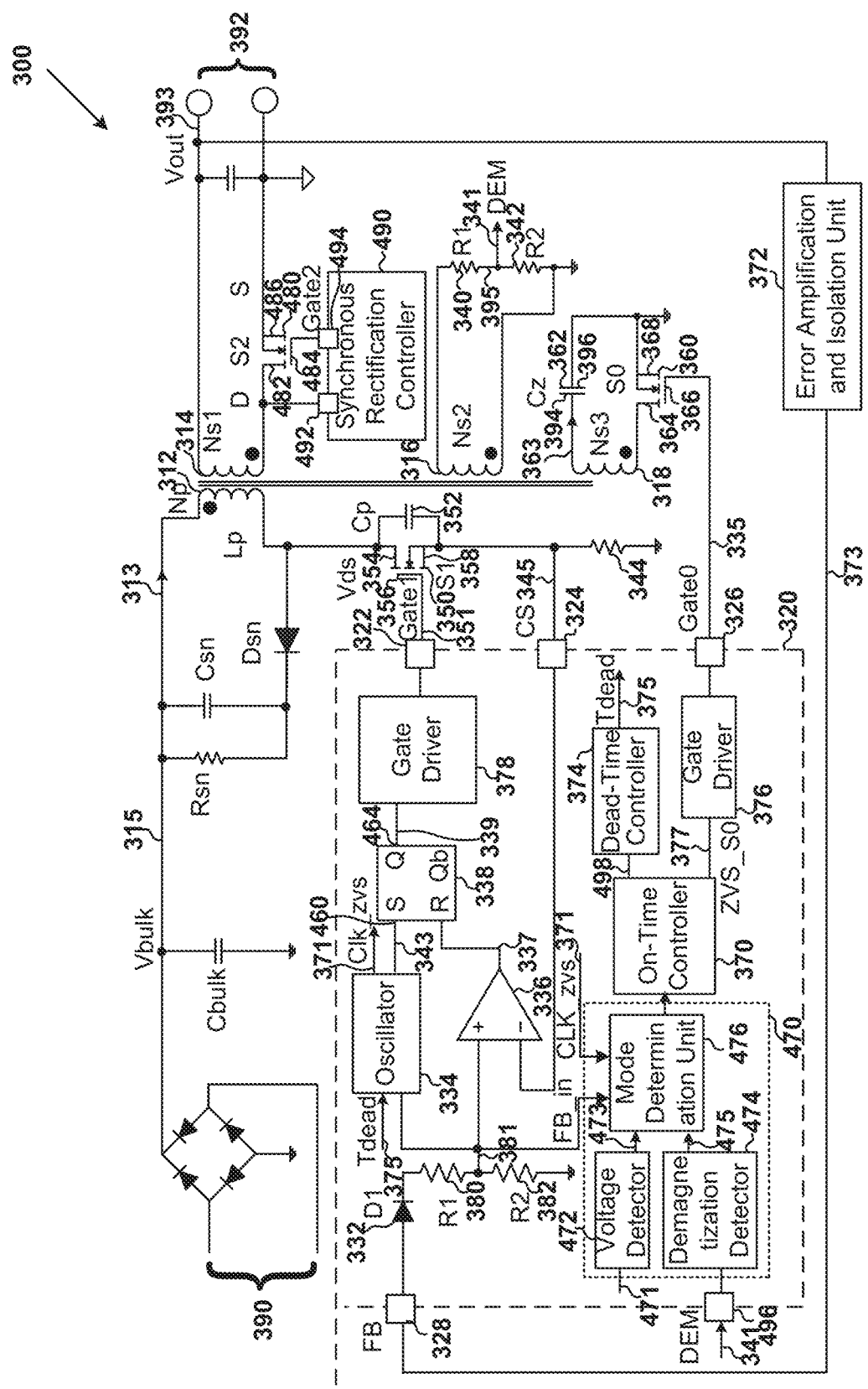
FIG. 3 is a simplified diagram showing a flyback switch-mode power converter according to certain embodiments of the present invention.

FIG. 3 is a simplified diagram showing a flyback switch-mode power converter according to certain embodiments of the present invention. This diagram is merely an example, which should not unduly limit the scope of the claims. One of ordinary skill in the art would recognize many variations, alternatives, and modifications. The flyback switch-mode power converter 300 includes a primary winding 312, a secondary winding 314, auxiliary windings 316 and 318, a controller chip 320, resistors 340, 342 and 344, transistors 350, 360 and 480, a capacitor 362, an error amplification and isolation unit 372, and a synchronous rectification controller 490. For example, the controller chip 320 includes resistors 380 and 382, a diode 332, an oscillator 334, a comparator 336, a flip flop 338, an on-time controller 370, a dead-time controller 374, and gate drivers 376 and 378, and a mode detector 470. As an example, the controller chip 320 also includes terminals 322, 324, 326, 328, and 496 (e.g., pins). In some examples, the mode detector 470 includes a voltage detector 472, a demagnetization detector 474, and a mode determination unit 476. In certain examples, the transistor 350 includes a parasitic capacitor 352. In some examples, the primary winding 312, the secondary winding 314, and the auxiliary windings 316 and 318 are coupled to each other and are parts of a transformer. For example, the transistor 350 is a metal-oxide-semiconductor field-effect transistor (MOSFET), a bipolar junction transistor (BJT) (e.g., BJT-NPN), an insulated-gate bipolar transistor (IGBT), or a gallium nitride (GaN) transistor. As an example, the transistor 360 is a metal-oxide-semiconductor field-effect transistor (MOSFET), a bipolar junction transistor (BJT) (e.g., BJT-NPN), an insulated-gate bipolar transistor (IGBT), or a gallium nitride (GaN) transistor. Although the above has been shown using a selected group of components for the flyback switch-mode power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the transistor 350 includes a drain terminal 354, a gate terminal 356, and a source terminal 358, and the transistor 360 includes a drain terminal 364, a gate terminal 366, and a source terminal 368. For example, the transistor 350 is connected to the primary winding 312. As an example, the transistor 360 is connected to the auxiliary winding 318. In some examples, the gate driver 378 of the controller chip 320 generates a drive voltage 351, and the gate driver 376 of the controller chip 320 generates a drive voltage 335. For example, the drive voltage 351 is received by the gate terminal 356 of the transistor 350, and the drive voltage 335 is received by the gate terminal 366 of the transistor 360. As an example, if the drive voltage 351 is at the logic high level, the transistor 350 is turned on, and if the drive voltage 351 is at the logic low level, the transistor 350 is turned off. For example, if the drive voltage 335 is at the logic high level, the transistor 360 is turned on, and if the drive voltage 335 is at the logic low level, the transistor 360 is turned off.

In some embodiments, the transistor 480 includes a drain terminal 482, a gate terminal 484, and a source terminal 486. For example, the synchronous rectification controller 490 includes two terminals 492 and 494. As an example, the terminal 492 is connected to the drain terminal 482 of the transistor 480, and the terminal 494 is connected to the gate terminal 484 of the transistor 480. In certain examples, the error amplification and isolation unit 372 receives an output voltage 392 and generates a feedback signal 373 based at least in part on the output voltage 392. For example, the flyback switch-mode power converter 300 regulates the output voltage 392 at a constant value, and the feedback signal 373 represents an output current 393 (e.g., an output load). As an example, the feedback signal 373 is received by the diode 332 that is connected to the resistor 380. In certain examples, based at least in part on the feedback signal 373, the resistors 380 and 382 generate a voltage 381 that represents the output current 393 (e.g., an output load). For example, the output current 393 is related to the secondary winding 314. In some examples, the resistors 340 and 342 generate a voltage 341, which represents a demagnetization process of the primary winding 312.

As shown in FIG. 3, the flyback switch-mode power converter 300 receives an AC input voltage 390 and generates the output voltage 392 according to certain embodiments. For example, a current 313 flows through the primary winding 312. As an example, a current 363 flows through the auxiliary winding 318. In some examples, the primary winding 312 receives a voltage 315. For example, the AC input voltage 390 is related to the primary winding 312. In certain examples, the capacitor 362 includes terminals 394 and 396.

According to some embodiments, the mode detector 470 receives the voltage 341, the voltage 381, a signal 371, and a signal 471. For example, the voltage 341 represents a demagnetization process of the primary winding 312. As an example, the voltage 381 represents the output voltage 392. In certain examples, the signal 371 is generated by the oscillator 334 and is used to set a maximum frequency for the operation frequency (e.g., the switching frequency) of the flyback switch-mode power converter 300. For example, the signal 371 is at a logic high level and/or at a logic low level. As an example, the signal 471 represents the peak amplitude of the AC input voltage 390. In certain examples, the signal 471 is directly proportional to the AC input voltage 390 through a voltage divider. In some examples, the signal 471 is directly proportional to the voltage 315 through a voltage divider. In certain examples, the signal 471 is a current 395 that flows through the resistor 340 to the auxiliary windings 316 without going through the resistor 342 by clamping the voltage 341 close to zero volts when the transistor 350 is turned on.

In certain embodiments, the mode detector 470 determines the mode of operation for the flyback switch-mode power converter 300 based at least in part on the voltage 341, the voltage 381, the signal 371, and/or the signal 471. For example, based at least in part on the determined mode of operation, the mode detector 470 generates a mode signal 477, which represents the determined mode of operation. As an example, the mode signal 477 is received by the on-time controller 370, which in response generates control signals 498 and 377. In some examples, the control signals 498 and 377 are used to generate the drive voltages 351 and 335. For example, the drive voltage 351 turns on and/or turns off the transistor 350. As an example, the drive voltage 335 turns on and/or turns off the transistor 360. In certain examples, based at least in part on the determined mode of operation, the controller chip 320 outputs the drive voltage 351 to control turning on and/or turning off of the transistor 350 and outputs the drive voltage 335 to control turning on and/or turning off of the transistor 360.

In some embodiments, the error amplification and isolation unit 372 receives the output voltage 392 and outputs the feedback signal 373 to the diode 332 through the terminal 328. For example, the diode 332 is connected to the resistor 380, which forms a voltage divider with the resistor 382. As an example, the voltage divider that includes the resistors 380 and 382 outputs the voltage 381 to the oscillator 334, the comparator 336 (e.g., a non-inverting input terminal of the comparator 336), and the mode determination unit 476 of the mode detector 470. In certain examples, the oscillator 334 also receives a dead-time signal 375 that is generated by the dead-time controller 374, and the comparator 336 (e.g., an inverting input terminal of the comparator 336) also receives a voltage 345 that is generates by the resistor 344 connected to the source terminal 358 of the transistor 350. For example, the voltage 345 represents a current that flows through the transistor 350. As an example, the comparator 336 compares the voltage 381 and the voltage 345 and in response, generates a comparison signal 337, which is received by the flip flop 338.

According to certain embodiments, the oscillator 334 receives the voltage 381 and the dead-time signal 375 and generates a signal 343 and the signal 371. For example, the signal 343 is the same as the dead-time signal 375. As an example, the signal 343 is the same as a signal that sets a minimum frequency for the operation frequency (e.g., the switching frequency) of the flyback switch-mode power converter 300. In some examples, the signal 371 sets a maximum frequency for the operation frequency (e.g., the switching frequency) of the flyback switch-mode power converter 300.

According to some embodiments, the flip flop 338 includes terminals 460, 462 and 464. For example, the terminal 460 of the flip flop 338 receives the signal 343 from the oscillator 334, and the terminal 462 of the flip flop 338 receives the comparison signal 337 from the comparator 336. As an example, the flip flop 338 generates a signal 339 at the terminal 464 based at least in part on the signal 343 and the comparison signal 337. In certain examples, the signal 539 is received by the gate driver 378, which in response generates the drive voltage 351 to turn on and/or turn off the transistor 350. In some examples, the control signal 377 is received by the gate driver 376, which in response generates the drive voltage 335 to turn on and/or turn off the transistor 360.

In certain embodiments, the controller chip 320 determines the mode of operation for the flyback switch-mode power converter 300 and based at least in part on the determined mode of operation, determines whether the transistor 360 remains turned off or becomes turned on during a switching cycle of the flyback switch-mode power converter 300. For example, if the determined mode of operation indicates that the flyback switch-mode power converter 300 operates in a discontinuous conduction mode (DCM) and a light load mode (LLM), the transistor 360 remains turned off throughout the entire switching cycle. As an example, if the determined mode of operation indicates that the flyback switch-mode power converter 300 operates in a continuous conduction mode (CCM) and a high AC voltage mode, the transistor 360 remains turned off throughout the entire switching cycle. For example, if the determined mode of operation indicates that the flyback switch-mode power converter 300 operates in a continuous conduction mode (CCM) and a low AC voltage mode, the transistor 360 remains turned off throughout the entire switching cycle. As an example, if the determined mode of operation indicates that the flyback switch-mode power converter 300 operates in a discontinuous conduction mode (DCM) but not in a light load mode (LLM), the transistor 360 becomes turned on during the switching cycle.

In some embodiments, the controller chip 320 determines the mode of operation for the flyback switch-mode power converter 300 and based at least in part on the determined mode of operation, determines whether or not to turn on the transistor 360 during a switching cycle of the flyback switch-mode power converter 300 and also determines when to turn on the transistor 350 during the switching cycle of the flyback switch-mode power converter 300. In certain examples, the voltage detector 472 of the mode detector 470 uses the signal 471 to detect the peak amplitude of the AC input voltage 390, determines whether the flyback switch-mode power converter 300 operates in a high AC voltage mode or a low AC voltage mode, and generates a signal 473 (e.g., a logic signal) indicating that the flyback switch-mode power converter 300 operates in a high AC voltage mode or a low AC voltage mode. For example, if the detected peak amplitude of the AC input voltage 390 becomes larger than a first predetermined threshold, the flyback switch-mode power converter 300 changes from a low AC voltage mode to a high AC voltage mode, and if the detected peak amplitude of the AC input voltage 390 becomes smaller than a second predetermined threshold, the flyback switch-mode power converter 300 changes from a high AC voltage mode to a low AC voltage mode, wherein the second predetermined threshold is smaller than the first predetermined threshold. In some examples, the demagnetization detector 474 of the mode detector 470 receives the voltage 341 and generates a demagnetization signal 475 (e.g., a logic signal) based at least in part on the demagnetization detector 474. For example, when the transistor 350 is turned off, the demagnetization detector 474 uses the voltage 341 to determines whether a demagnetization process of the primary winding 312 ends. As an example, if the demagnetization detector 474 determines that a demagnetization process of the primary winding 312 has ended, the demagnetization signal 475 changes from a logic high level to a logic low level.

According to certain embodiments, the mode determination unit 476 of the mode detector 470 receives the signal 473 from the voltage detector 472 and the demagnetization signal 475 from the demagnetization detector 474, and the mode determination unit 476 also receives the voltage 381 and the signal 371. In some examples, the mode determination unit 476 of the mode detector 470 determines the mode of operation for the flyback switch-mode power converter 300 based at least in part on the signal 473, the demagnetization signal 475, the voltage 381 and the signal 371, and generates the mode signal 477 to indicate the determined mode of operation. For example, the determined mode of operation shows the flyback switch-mode power converter 300 operates in a discontinuous conduction mode (DCM) and a light load mode (LLM). As an example, the determined mode of operation shows that the flyback switch-mode power converter 300 operates in a continuous conduction mode (CCM) and a high AC voltage mode. For example, the determined mode of operation shows the flyback switch-mode power converter 300 operates in a continuous conduction mode (CCM) and a low AC voltage mode. As an example, the determined mode of operation shows the flyback switch-mode power converter 300 operates in a discontinuous conduction mode (DCM) but not in a light load mode (LLM).

Figure 4:
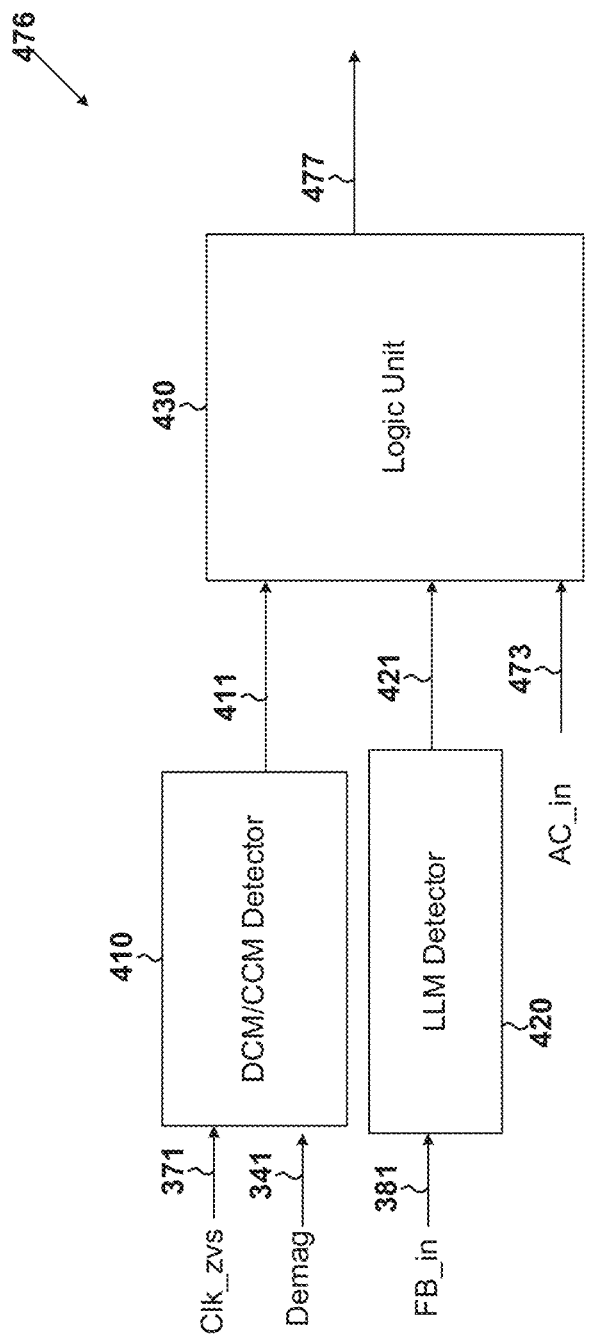
FIG. 4 is a simplified diagram showing the mode determination unit of the mode detector as part of the controller chip of the flyback switch-mode power converter as shown in FIG. 3 according to some embodiments of the present invention.

FIG. 4 is a simplified diagram showing the mode determination unit 476 of the mode detector 470 as part of the controller chip 320 of the flyback switch-mode power converter 300 as shown in FIG. 3 according to some embodiments of the present invention. This diagram is merely an example, which should not unduly limit the scope of the claims. One of ordinary skill in the art would recognize many variations, alternatives, and modifications. The mode determination unit 476 includes a DCM/CCM detector 410, an LLM detector 420, and a logic unit 430. Although the above has been shown using a selected group of components for the mode determination unit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the DCM/CCM detector 410 receives the signal 371 from the oscillator 334 and the demagnetization signal 475 from the demagnetization detector 474, and the LLM detector 420 receives the voltage 381 from the voltage divider that includes the resistors 380 and 382. For example, the DCM/CCM detector 410 generates a detection signal 411 based at least in part on the signal 371 and the demagnetization signal 475. As an example, the LLM detector 420 generates a detection signal 421 based at least in part on the voltage 381. In some examples, the logic unit 430 receives the detection signal 411 from the DCM/CCM detector 410 and the detection signal 421 from the LLM detector 420, and the logic unit 430 also receives the signal 473 from the voltage detector 472. As an example, the logic unit 430 generates the mode signal 477 based at least in part on the detection signal 411, the detection signal 421, and the signal 473.

In some embodiments, the DCM/CCM detector 410 determines whether the flyback switch-mode power converter 300 is in a discontinuous conduction mode (DCM) or in a continuous conduction mode (CCM) based at least in part on the signal 371 and the demagnetization signal 475. For example, if when the signal 371 changes from the logic low level to the logic high level, the demagnetization signal 475 indicates the demagnetization process of the primary winding 312 has ended (e.g., if when the signal 371 changes from the logic low level to the logic high level, the demagnetization signal 475 is at the logic low level), the DCM/CCM detector 410 determines that the flyback switch-mode power converter 300 is in a discontinuous conduction mode (DCM). As an example, if when the signal 371 changes from the logic low level to the logic high level, the demagnetization signal 475 indicates the demagnetization process of the primary winding 312 has not ended (e.g., if when the signal 371 changes from the logic low level to the logic high level, the demagnetization signal 475 is at the logic high level), the DCM/CCM detector 410 determines that the flyback switch-mode power converter 300 is in a continuous conduction mode (CCM).

Figure 6:
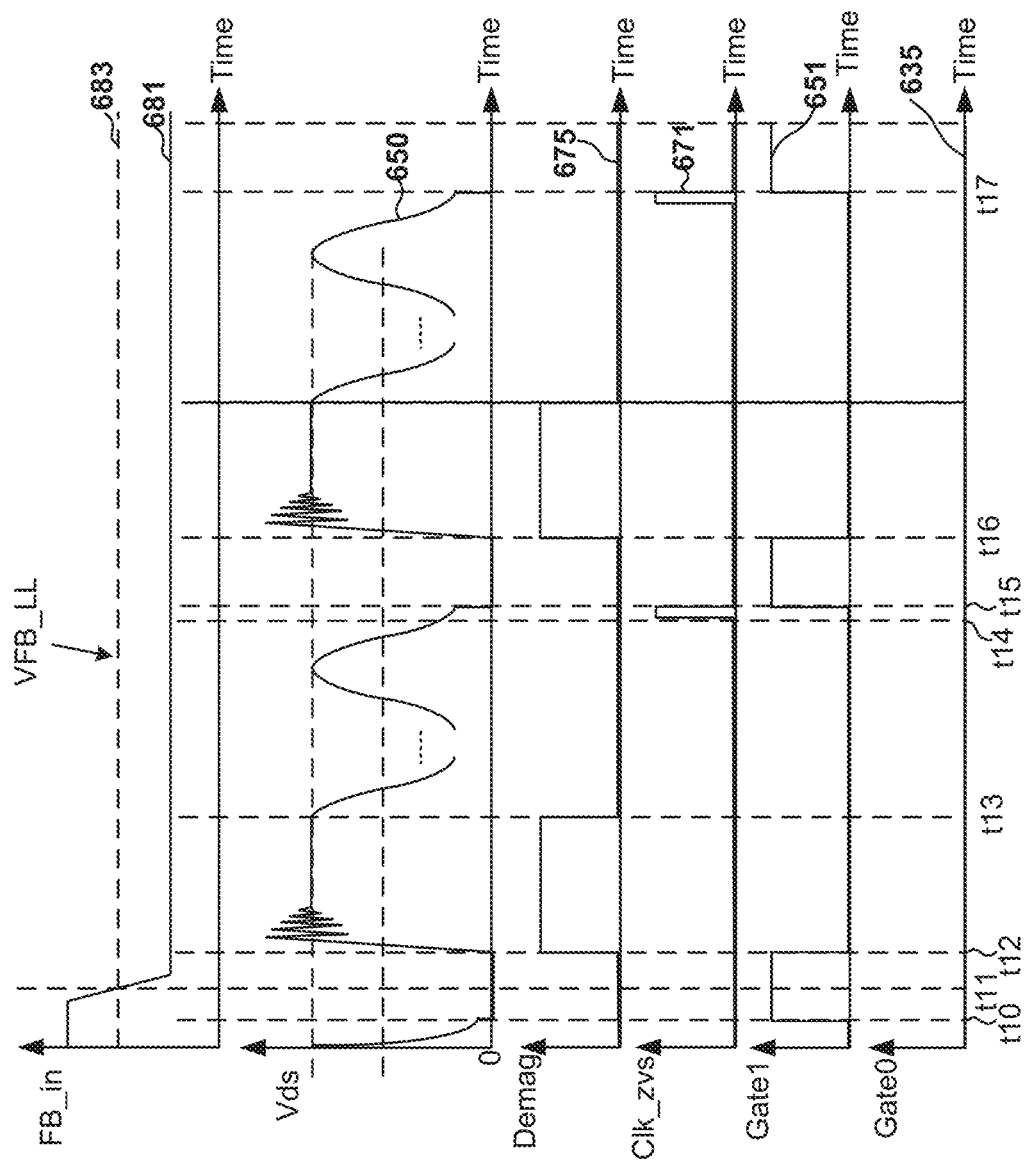
FIG. 6 shows simplified timing diagrams for the controller chip of the flyback switch-mode power converter as shown in FIG. 3 if the flyback switch-mode power converter operates in a discontinuous conduction mode (DCM) and a light load mode (LLM) according to some embodiments of the present invention.
Figure 7:
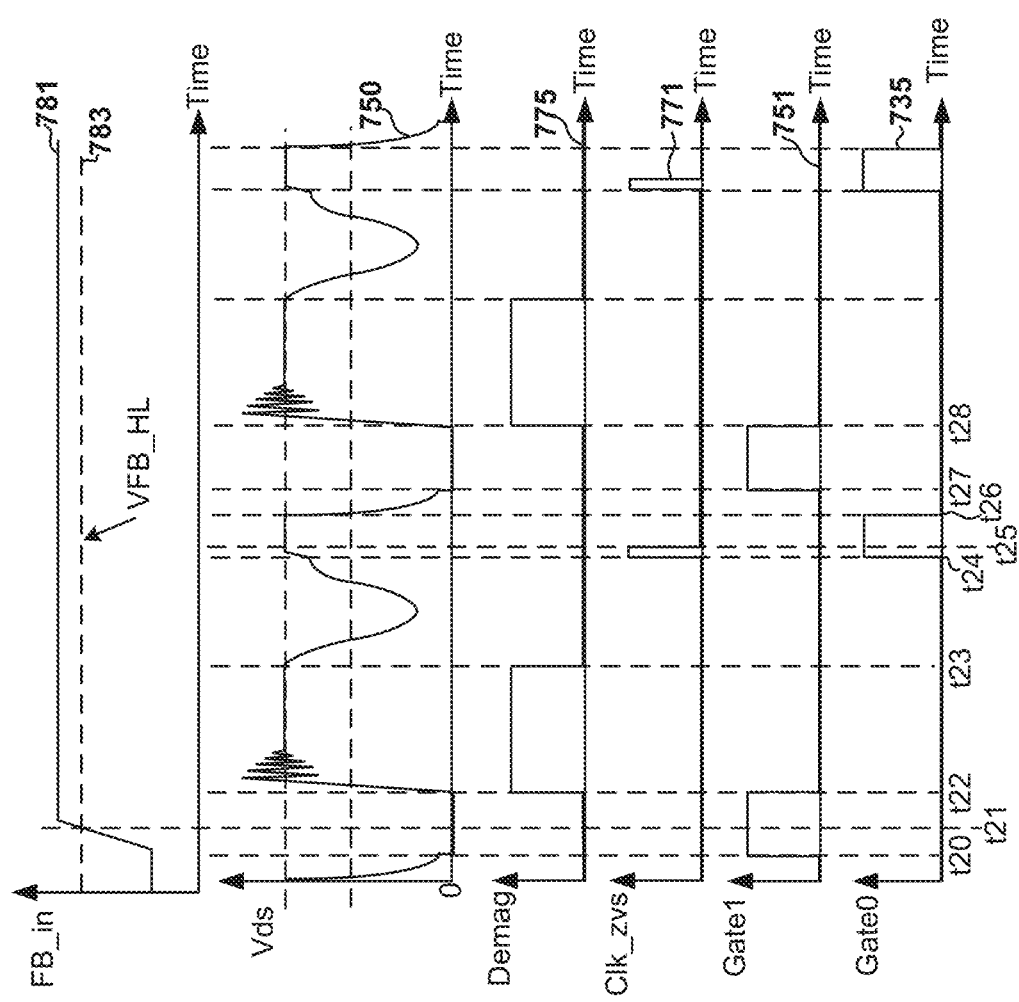
FIG. 7 shows simplified timing diagrams for the controller chip of the flyback switch-mode power converter as shown in FIG. 3 if the flyback switch-mode power converter operates in a discontinuous conduction mode (DCM) but not in a light load mode (LLM) according to some embodiments of the present invention.

In certain embodiments, the LLM detector 420 determines whether or not the flyback switch-mode power converter 300 is in a light load mode (LLM) based at least in part on the voltage 381. For example, if the voltage 381 becomes larger than a third predetermined threshold (e.g., the threshold 783 as shown in FIG. 7), the flyback switch-mode power converter 300 changes from being in a light load mode (LLM) to not being in a light load mode (LLM), and if the voltage 381 becomes smaller than a fourth predetermined threshold (e.g., the threshold 683 as shown in FIG. 6), the flyback switch-mode power converter 300 changes from not being in a light load mode (LLM) to being in a light load mode (LLM), wherein the fourth predetermined threshold (e.g., the threshold 683 as shown in FIG. 6) is smaller than the third predetermined threshold (e.g., the threshold 783 as shown in FIG. 7).

In some embodiments, the logic unit 430 determines the mode of operation of the flyback switch-mode power converter 300 based at least in part on the detection signal 411, the detection signal 421, and the signal 473. For example, the determined mode of operation shows the flyback switch-mode power converter 300 operates in a discontinuous conduction mode (DCM) and a light load mode (LLM). As an example, the determined mode of operation shows that the flyback switch-mode power converter 300 operates in a continuous conduction mode (CCM) and a high AC voltage mode. For example, the determined mode of operation shows the flyback switch-mode power converter 300 operates in a continuous conduction mode (CCM) and a low AC voltage mode. As an example, the determined mode of operation shows the flyback switch-mode power converter 300 operates in a discontinuous conduction mode (DCM) but not in a light load mode (LLM).

As discussed above and further emphasized here, FIG. 4 is merely an example, which should not unduly limit the scope of the claims. One of ordinary skill in the art would recognize many variations, alternatives, and modifications. For example, the mode determination unit 476 determines whether the flyback switch-mode power converter 300 is in a discontinuous conduction mode (DCM) or in a continuous conduction mode (CCM), and also determines whether the flyback switch-mode power converter 300 is in a light load mode (LLM) or not in a light load mode (LLM). As an example, the mode determination unit 476 determines whether the flyback switch-mode power converter 300 is in a discontinuous conduction mode (DCM) or in a continuous conduction mode (CCM), or determines whether the flyback switch-mode power converter 300 is in a light load mode (LLM) or not in a light load mode (LLM).

Figure 5:
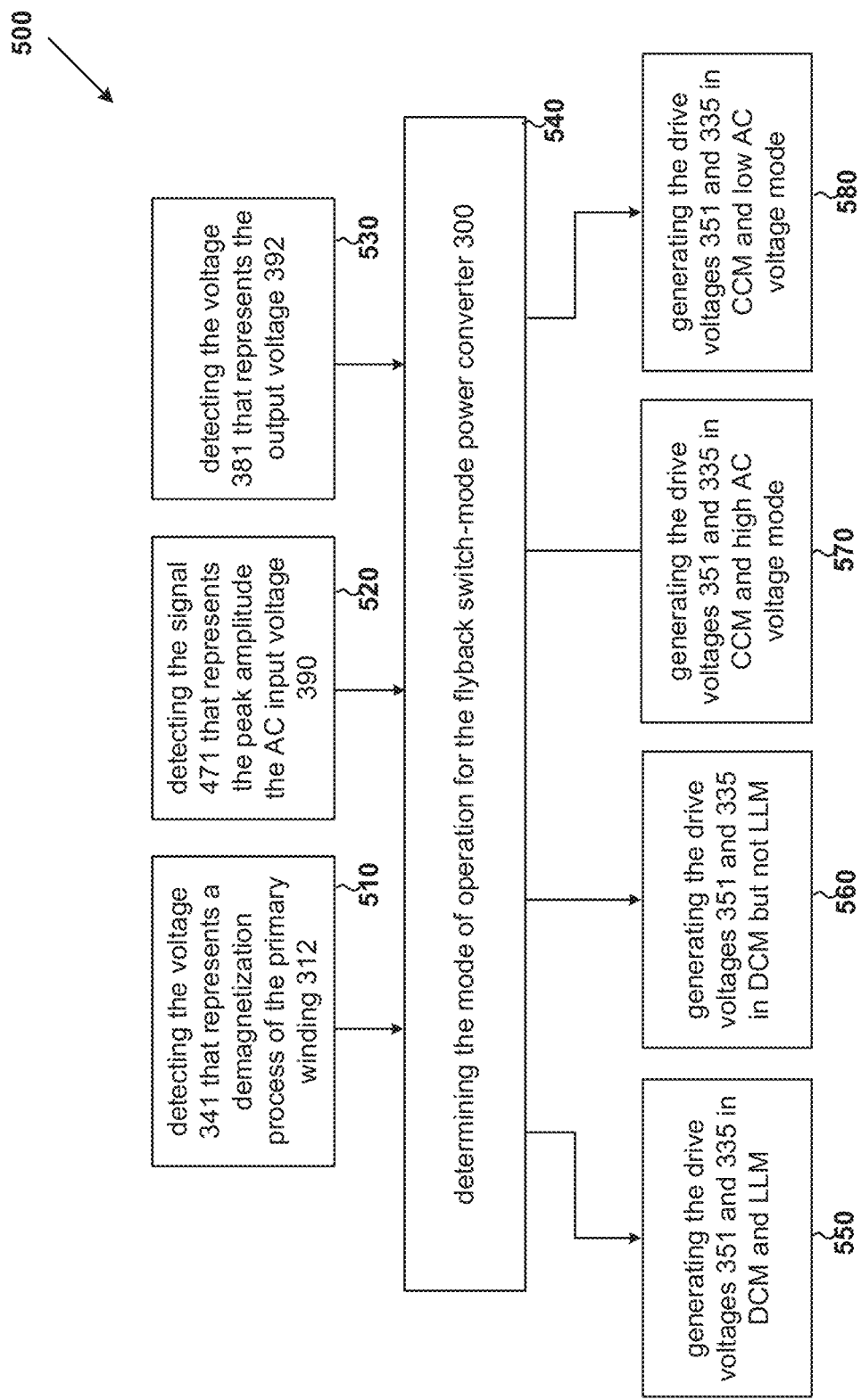
FIG. 5 is a simplified diagram showing a method for the controller chip of the flyback switch-mode power converter as shown in FIG. 3 according to certain embodiments of the present invention.

FIG. 5 is a simplified diagram showing a method for the controller chip 320 of the flyback switch-mode power converter 300 as shown in FIG. 3 according to certain embodiments of the present invention. This diagram is merely an example, which should not unduly limit the scope of the claims. One of ordinary skill in the art would recognize many variations, alternatives, and modifications. The method 500 includes a process 510 for detecting the voltage 341 that represents a demagnetization process of the primary winding 312, a process 520 for detecting the signal 471 that represents the peak amplitude of the AC input voltage 390, a process 530 for detecting the voltage 381 that represents the output voltage 392, a process 540 for determining the mode of operation for the flyback switch-mode power converter 300, a process 550 for generating the drive voltages 351 and 335 in DCM and LLM, a process 560 for generating the drive voltages 351 and 335 in DCM but not LLM, a process 570 for generating the drive voltages 351 and 335 in CCM and high AC voltage mode, and a process 580 for generating the drive voltages 351 and 335 in CCM and low AC voltage mode. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification.

At the process 510, the voltage 341 is detected by the demagnetization detector 474 of the mode detector 470 according to some embodiments. For example, the voltage 341 represents a demagnetization process of the primary winding 312. As an example, the demagnetization detector 474 uses the voltage 341 when the transistor 350 is turned off to determine an end of a demagnetization process of the primary winding 312.

At the process 520, the signal 471 is detected by the voltage detector 472 of the mode detector 470 according to certain embodiments. For example, the signal 471 represents the peak amplitude of the AC input voltage 390.

At the process 530, the voltage 381 is detected by the mode determination unit 476 of the mode detector 470 according to some embodiments. For example, the voltage 381 represents the output voltage 392. As an example, the voltage 381 is used to determine whether or not the flyback switch-mode power converter 300 is in a light load mode (LLM).

At the process 540, the mode of operation for the flyback switch-mode power converter 300 is determined by the mode determination unit 476 of the mode detector 470 according to certain embodiments. For example, if the determined mode of operation shows the flyback switch-mode power converter 300 operates in a discontinuous conduction mode (DCM) and a light load mode (LLM), the process 550 is performed. As an example, if the determined mode of operation shows that the flyback switch-mode power converter 300 operates in a continuous conduction mode (CCM) and a high AC voltage mode, the process 570 is performed. For example, if the determined mode of operation shows the flyback switch-mode power converter 300 operates in a continuous conduction mode (CCM) and a low AC voltage mode, the process 580 is performed. As an example, if the determined mode of operation shows the flyback switch-mode power converter 300 operates in a discontinuous conduction mode (DCM) but not in a light load mode (LLM), the process 560 is performed. In some examples, regardless of the mode of operation for the flyback switch-mode power converter 300, during every switching cycle of the flyback switch-mode power converter 300, the drive voltage 351 is generated to turn on the transistor 350.

At the process 550, the drive voltages 351 and 335 are generated if the flyback switch-mode power converter 300 operates in a discontinuous conduction mode (DCM) and a light load mode (LLM) according to some embodiments. For example, when the flyback switch-mode power converter 300 operates in a discontinuous conduction mode (DCM) and a light load mode (LLM), during every switching cycle of the flyback switch-mode power converter 300, the drive voltage 335 is generated so that the transistor 360 remains turned off, and the drive voltage 351 is generated to turn on the transistor 350 based at least in part on the signal 371. As an example, the signal 371 sets a maximum frequency for the operation frequency (e.g., the switching frequency) of the flyback switch-mode power converter 300.

At the process 560, the drive voltages 351 and 335 are generated if the flyback switch-mode power converter 300 operates in a discontinuous conduction mode (DCM) but not in a light load mode (LLM) according to certain embodiments. For example, when the flyback switch-mode power converter 300 operates in a discontinuous conduction mode (DCM) but not in a light load mode (LLM), during every switching cycle of the flyback switch-mode power converter 300, the drive voltages 335 and 351 are generated to turn on the transistor 360 and then turn on the transistor 350 based at least in part on the signal 371. As an example, the signal 371 sets a maximum frequency for the operation frequency (e.g., the switching frequency) of the flyback switch-mode power converter 300.

At the process 570, the drive voltages 351 and 335 are generated if the flyback switch-mode power converter 300 operates in a continuous conduction mode (CCM) and a high AC voltage mode according to some embodiments. For example, when the flyback switch-mode power converter 300 operates in a continuous conduction mode (CCM) and a high AC voltage mode, during every switching cycle of the flyback switch-mode power converter 300, the drive voltage 335 is generated so that the transistor 360 remains turned off, and the drive voltage 351 is generated to turn on the transistor 350 based at least in part on the signal that sets a minimum frequency for the operation frequency (e.g., the switching frequency) of the flyback switch-mode power converter 300.

At the process 580, the drive voltages 351 and 335 are generated if the determined mode of operation shows the flyback switch-mode power converter 300 operates in a continuous conduction mode (CCM) and a low AC voltage mode according to certain embodiments. For example, when the flyback switch-mode power converter 300 operates in a continuous conduction mode (CCM) and a low AC voltage mode, during every switching cycle of the flyback switch-mode power converter 300, the drive voltage 335 is generated so that the transistor 360 remains turned off, and the drive voltage 351 is generated to turn on the transistor 350 based at least in part on the signal 371. As an example, the signal 371 sets a maximum frequency for the operation frequency (e.g., the switching frequency) of the flyback switch-mode power converter 300.

FIG. 6 shows simplified timing diagrams for the controller chip 320 of the flyback switch-mode power converter 300 as shown in FIG. 3 if the flyback switch-mode power converter 300 operates in a discontinuous conduction mode (DCM) and a light load mode (LLM) according to some embodiments of the present invention. These diagrams are merely examples, which should not unduly limit the scope of the claims. One of ordinary skill in the art would recognize many variations, alternatives, and modifications. The waveform 681 represents the voltage 381 as a function of time, the waveform 650 represents the voltage drop from the drain terminal 354 to the source terminal 358 of the transistor 350 as a function of time, the waveform 675 represents the demagnetization signal 475 as a function of time, the waveform 671 represents the signal 371 as a function of time, the waveform 651 represents the drive voltage 351 as a function of time, and the waveform 635 represents the drive voltage 335 as a function of time.

At time $t_{10}$, the drive voltage 351 changes from a logic low level to a logic high level as shown by the waveform 651, and the transistor 350 becomes turned on according to certain embodiments. For example, at time $t_{10}$, the voltage 381 is higher than a threshold 683 as shown by the waveform 681, and the flyback switch-mode power converter 300 is not in a light load mode (LLM). As an example, at time $t_{10}$, the demagnetization signal 475 is at the logic low level as shown by the waveform 675, indicating the primary winding 312 is not in any demagnetization process. For example, at time $t_{10}$, the signal 371 is at the logic low level as shown by the waveform 671. As an example, at time $t_{10}$, the drive voltage 335 is at the logic low level as shown by the waveform 635, and the transistor 360 is turned off.

From time $t_{10}$ to time $t_{11}$, the voltage 381 remains larger than the threshold 683 as shown by the waveform 681, and the flyback switch-mode power converter 300 remains not in the light load mode (LLM) according to some embodiments. For example, from time $t_{10}$ to time $t_{11}$, the drive voltage 351 remains at the logic high level as shown by the waveform 651, and the transistor 350 remains turned on. As an example, from time $t_{10}$ to time $t_{11}$, the demagnetization signal 475 remains at the logic low level as shown by the waveform 675, indicating the primary winding 312 remains not in any demagnetization process. For example, from time $t_{10}$ to time $t_{11}$, the signal 371 remains at the logic low level as shown by the waveform 671. As an example, from time $t_{10}$ to time $t_{11}$, the drive voltage 335 remains at the logic low level as shown by the waveform 635, and the transistor 360 remains turned off.

At time $t_{11}$, the voltage 381 becomes smaller than the threshold 683 as shown by the waveform 681, and the flyback switch-mode power converter 300 changes from not being in the light load mode (LLM) to being in the light load mode (LLM) according to certain embodiments. For example, at time $t_{11}$, the drive voltage 351 is at the logic high level as shown by the waveform 651, and the transistor 350 is turned on. As an example, at time $t_{11}$, the demagnetization signal 475 is at the logic low level as shown by the waveform 675, indicating the primary winding 312 is not in any demagnetization process. For example, at time $t_{11}$, the signal 371 is at the logic low level as shown by the waveform 671. As an example, at time $t_{11}$, the drive voltage 335 is at the logic low level as shown by the waveform 635, and the transistor 360 is turned off. In some examples, at time $t_{11}$, the controller chip 320 of the flyback switch-mode power converter 300 detects that the flyback switch-mode power converter 300 enters the light load mode (LLM).

From time $t_{11}$ to time $t_{12}$, the voltage 381 remains smaller than the threshold 683 as shown by the waveform 681, and the flyback switch-mode power converter 300 remains in the light load mode (LLM) according to some embodiments.

For example, from time $t_{11}$ to time $t_{12}$, the drive voltage 351 remains at the logic high level as shown by the waveform 651, and the transistor 350 remains turned on. As an example, from time $t_{11}$ to time $t_{12}$, the demagnetization signal 475 remains at the logic low level as shown by the waveform 675, indicating the primary winding 312 is not in any demagnetization process. For example, from time $t_{11}$ to time $t_{12}$, the signal 371 remains at the logic low level as shown by the waveform 671. As an example, from time $t_{11}$ to time $t_{12}$, the drive voltage 335 remains at the logic low level as shown by the waveform 635, and the transistor 360 remains turned off.

At time $t_{12}$, the demagnetization signal 475 changes from the logic low level to the logic high level as shown by the waveform 675, indicating the primary winding 312 starts undergoing a demagnetization process according to certain embodiments. For example, at time $t_{12}$, the drive voltage 351 changes from the logic high level to the logic low level as shown by the waveform 651, and the transistor 350 becomes turned off. As an example, at time $t_{12}$, the voltage 381 is smaller than the threshold 683 as shown by the waveform 681, and the flyback switch-mode power converter 300 is in the light load mode (LLM). For example, at time $t_{12}$, the signal 371 is at the logic low level as shown by the waveform 671. As an example, at time $t_{12}$, the drive voltage 335 is at the logic low level as shown by the waveform 635, and the transistor 360 is turned off.

From time $t_{12}$ to time $t_{13}$, the demagnetization signal 475 remains at the logic high level as shown by the waveform 675, indicating the primary winding 312 undergoes the demagnetization process according to some embodiments. For example, from time $t_{12}$ to time $t_{13}$, the drive voltage 351 remains at the logic low level as shown by the waveform 651, and the transistor 350 remains turned off. As an example, from time $t_{12}$ to time $t_{13}$, the voltage 381 remains smaller than the threshold 683 as shown by the waveform 681, and the flyback switch-mode power converter 300 remains in the light load mode (LLM). For example, from time $t_{12}$ to time $t_{13}$, the signal 371 remains at the logic low level as shown by the waveform 671. As an example, from time $t_{12}$ to time $t_{13}$, the drive voltage 335 remains at the logic low level as shown by the waveform 635, and the transistor 360 remains turned off.

At time $t_{13}$, the demagnetization signal 475 changes from the logic high level to the logic low level as shown by the waveform 675, indicating the demagnetization process of the primary winding 312 ends according to certain embodiments. For example, at time $t_{13}$, the drive voltage 351 is at the logic low level as shown by the waveform 651, and the transistor 350 is turned off. As an example, at time $t_{13}$, the voltage 381 is smaller than the threshold 683 as shown by the waveform 681, and the flyback switch-mode power converter 300 is in the light load mode (LLM). For example, at time $t_{13}$, the signal 371 is at the logic low level as shown by the waveform 671. As an example, at time $t_{13}$, the drive voltage 335 is at the logic low level as shown by the waveform 635, and the transistor 360 is turned off.

From time 113 to time $t_{14}$, the demagnetization signal 475 remains at the logic low level as shown by the waveform 675, indicating the primary winding 312 does not undergo any demagnetization process according to certain embodiments. For example, from time $t_{13}$ to time $t_{14}$, the drive voltage 351 remains at the logic low level as shown by the waveform 651, and the transistor 350 remains turned off. As an example, from time $t_{13}$ to time $t_{14}$, the voltage 381 remains smaller than the threshold 683 as shown by the waveform 681, and the flyback switch-mode power converter 300 remains in the light load mode (LLM). For example, from time $t_{13}$ to time $t_{14}$, the signal 371 remains at the logic low level as shown by the waveform 671. As an example, from time $t_{13}$ to time $t_{14}$, the drive voltage 335 remains at the logic low level as shown by the waveform 635, and the transistor 360 remains turned off.

At time $t_{14}$, the signal 371 changes from the logic low level to the logic high level as shown by the waveform 671 according to some embodiments. For example, at time $t_{14}$, the demagnetization signal 475 is at the logic low level as shown by the waveform 675, indicating the primary winding 312 does not undergo any demagnetization process. As an example, at time $t_{14}$, the drive voltage 351 is at the logic low level as shown by the waveform 651, and the transistor 350 is turned off. For example, at time $t_{14}$, the voltage 381 is smaller than the threshold 683 as shown by the waveform 681, and the flyback switch-mode power converter 300 is in the light load mode (LLM). As an example, at time $t_{14}$, the drive voltage 335 is at the logic low level as shown by the waveform 635, and the transistor 360 is turned off. In certain examples, the signal 371 changes from the logic low level to the logic high at time $t_{14}$ after the demagnetization process of the primary winding 312 ends at time $t_{13}$, and at time $t_{14}$, the controller chip 320 of the flyback switch-mode power converter 300 detects that the flyback switch-mode power converter 300 is in a discontinuous conduction mode (DCM). For example, before time $t_{14}$, at time $t_{11}$, the controller chip 320 of the flyback switch-mode power converter 300 detects that the flyback switch-mode power converter 300 enters the light load mode (LLM). As an example, at time $t_{14}$, the controller chip 320 of the flyback switch-mode power converter 300 determines that the flyback switch-mode power converter 300 operates in both the discontinuous conduction mode (DCM) and the light load mode (LLM).

From time $t_{14}$ to time $t_{15}$, the signal 371 remains at the logic high level as shown by the waveform 671 according to certain embodiments. For example, from time $t_{14}$ to time $t_{15}$, the demagnetization signal 475 remains at the logic low level as shown by the waveform 675, indicating the primary winding 312 does not undergo any demagnetization process. As an example, from time $t_{14}$ to time $t_{15}$, the drive voltage 351 remains at the logic low level as shown by the waveform 651, and the transistor 350 remains turned off. For example, from time $t_{14}$ to time $t_{15}$, the voltage 381 remains smaller than the threshold 683 as shown by the waveform 681, and the flyback switch-mode power converter 300 remains in the light load mode (LLM). As an example, from time $t_{14}$ to time $t_{15}$, the drive voltage 335 remains at the logic low level as shown by the waveform 635, and the transistor 360 remains turned off.

At time $t_{15}$, the signal 371 changes from the logic high level to the logic low level as shown by the waveform 671 according to some embodiments. For example, at time $t_{15}$, the drive voltage 351 changes from the logic low level to the logic high level as shown by the waveform 651, and the transistor 350 becomes turned on. As example, at time $t_{15}$, the demagnetization signal 475 is at the logic low level as shown by the waveform 675, indicating the primary winding 312 does not undergo any demagnetization process. For example, at time $t_{15}$, the voltage 381 is smaller than the threshold 683 as shown by the waveform 681, and the flyback switch-mode power converter 300 is in the light load mode (LLM). As an example, at time $t_{15}$, the drive voltage 335 is at the logic low level as shown by the waveform 635, and the transistor 360 is turned off.

From time $t_{15}$ to time $t_{16}$, the signal 371 remains at the logic low level as shown by the waveform 671 according to certain embodiments. For example, from time $t_{15}$ to time $t_{16}$, the drive voltage 351 remains at the logic high level as shown by the waveform 651, and the transistor 350 remains turned on. As example, from time $t_{15}$ to time $t_{16}$, the demagnetization signal 475 remains at the logic low level as shown by the waveform 675, indicating the primary winding 312 does not undergo any demagnetization process. For example, from time $t_{15}$ to time $t_{16}$, the voltage 381 remains smaller than the threshold 683 as shown by the waveform 681, and the flyback switch-mode power converter 300 remains in the light load mode (LLM). As an example, from time $t_{15}$ to time $t_{16}$, the drive voltage 335 remains at the logic low level as shown by the waveform 635, and the transistor 360 remains turned off.

At time $t_{16}$, the drive voltage 351 changes from the logic high level to the logic low level as shown by the waveform 651, and the transistor 350 becomes turned off according to some embodiments. For example, at time $t_{16}$, the demagnetization signal 475 changes from the logic low level to the logic high level as shown by the waveform 675, indicating the primary winding 312 starts undergoing a demagnetization process. As an example, at time $t_{16}$, the signal 371 is at the logic low level as shown by the waveform 671. For example, at time $t_{16}$, the voltage 381 is smaller than the threshold 683 as shown by the waveform 681, and the flyback switch-mode power converter 300 is in the light load mode (LLM). As an example, at time $t_{16}$, the drive voltage 335 is at the logic low level as shown by the waveform 635, and the transistor 360 is turned off.

According to certain embodiments, at time $t_{14}$, the controller chip 320 of the flyback switch-mode power converter 300 determines that the flyback switch-mode power converter 300 operates in both the discontinuous conduction mode (DCM) and the light load mode (LLM). In some examples, when the flyback switch-mode power converter 300 operates in the discontinuous conduction mode (DCM) and the light load mode (LLM), during every switching cycle (e.g., a switching cycle from time $t_{15}$ to time $t_{17}$), the drive voltage 335 remains at the logic low level and the transistor 360 remains turned off. In certain examples, when the flyback switch-mode power converter 300 operates in the discontinuous conduction mode (DCM) and the light load mode (LLM), during every switching cycle (e.g., a switching cycle from time $t_{15}$ to time $t_{17}$), the drive voltage 351 is generated to turn on the transistor 350 based at least in part on the signal 371. For example, at time $t_{15}$, in response to the signal 371 changing from the logic high level to the logic low level, the drive voltage 351 changes from the logic low level to the logic high level, and the transistor 350 becomes turned on. As an example, from time $t_{15}$ to time $t_{16}$, the drive voltage 351 remains at the logic high level, and the transistor 350 remains turned on, wherein the time duration from time $t_{15}$ to time $t_{16}$ has a predetermined length.

FIG. 7 shows simplified timing diagrams for the controller chip 320 of the flyback switch-mode power converter 300 as shown in FIG. 3 if the flyback switch-mode power converter 300 operates in a discontinuous conduction mode (DCM) but not in a light load mode (LLM) according to some embodiments of the present invention. These diagrams are merely examples, which should not unduly limit the scope of the claims. One of ordinary skill in the art would recognize many variations, alternatives, and modifications. The waveform 781 represents the voltage 381 as a function of time, the waveform 750 represents the voltage drop from the drain terminal 354 to the source terminal 358 of the transistor 350 as a function of time, the waveform 775 represents the demagnetization signal 475 as a function of time, the waveform 771 represents the signal 371 as a function of time, the waveform 751 represents the drive voltage 351 as a function of time, and the waveform 735 represents the drive voltage 335 as a function of time.

At time $t_{20}$, the drive voltage 351 changes from a logic low level to a logic high level as shown by the waveform 751, and the transistor 350 becomes turned on according to certain embodiments. For example, at time $t_{20}$, the voltage 381 is lower than a threshold 783 as shown by the waveform 781, and the flyback switch-mode power converter 300 is in a light load mode (LLM). As an example, at time $t_{20}$, the demagnetization signal 475 is at the logic low level as shown by the waveform 775, indicating the primary winding 312 is not in any demagnetization process. For example, at time $t_{20}$, the signal 371 is at the logic low level as shown by the waveform 771. As an example, at time $t_{20}$, the drive voltage 335 is at the logic low level as shown by the waveform 735, and the transistor 360 is turned off. In some examples, the threshold 783 as shown in FIG. 7 is larger than the threshold 683 as shown in FIG. 6.

From time $t_{20}$ to time $t_{21}$, the voltage 381 remains smaller than the threshold 783 as shown by the waveform 781, and the flyback switch-mode power converter 300 remains in the light load mode (LLM) according to some embodiments. For example, from time $t_{20}$ to time $t_{21}$, the drive voltage 351 remains at the logic high level as shown by the waveform 751, and the transistor 350 remains turned on. As an example, from time $t_{20}$ to time $t_{21}$, the demagnetization signal 475 remains at the logic low level as shown by the waveform 775, indicating the primary winding 312 remains not in any demagnetization process. For example, from time $t_{20}$ to time $t_{21}$, the signal 371 remains at the logic low level as shown by the waveform 771. As an example, from time $t_{20}$ to time $t_{21}$, the drive voltage 335 remains at the logic low level as shown by the waveform 735, and the transistor 360 remains turned off.

At time $t_{21}$, the voltage 381 becomes larger than the threshold 783 as shown by the waveform 781, and the flyback switch-mode power converter 300 changes from being in the light load mode (LLM) to not being in the light load mode (LLM) according to certain embodiments. For example, at time $t_{21}$, the drive voltage 351 is at the logic high level as shown by the waveform 751, and the transistor 350 is turned on. As an example, at time $t_{21}$, the demagnetization signal 475 is at the logic low level as shown by the waveform 775, indicating the primary winding 312 is not in any demagnetization process. For example, at time $t_{21}$, the signal 371 is at the logic low level as shown by the waveform 771. As an example, at time $t_{21}$, the drive voltage 335 is at the logic low level as shown by the waveform 735, and the transistor 360 is turned off. In some examples, at time $t_{21}$, the controller chip 320 of the flyback switch-mode power converter 300 detects that the flyback switch-mode power converter 300 exits the light load mode (LLM).

From time $t_{21}$ to time $t_{22}$, the voltage 381 remains larger than the threshold 783 as shown by the waveform 781, and the flyback switch-mode power converter 300 remains not in the light load mode (LLM) according to some embodiments. For example, from time $t_{21}$ to time $t_{22}$, the drive voltage 351 remains at the logic high level as shown by the waveform 751, and the transistor 350 remains turned on. As an example, from time $t_{21}$ to time $t_{22}$, the demagnetization signal 475 remains at the logic low level as shown by the waveform 775, indicating the primary winding 312 is not in any demagnetization process. For example, from time $t_{21}$ to time $t_{22}$, the signal 371 remains at the logic low level as shown by the waveform 771. As an example, from time $t_{21}$ to time $t_{22}$, the drive voltage 335 remains at the logic low level as shown by the waveform 735, and the transistor 360 remains turned off.

At time $t_{22}$, the demagnetization signal 475 changes from the logic low level to the logic high level as shown by the waveform 775, indicating the primary winding 312 starts undergoing a demagnetization process according to certain embodiments. For example, at time $t_{22}$, the drive voltage 351 changes from the logic high level to the logic low level as shown by the waveform 751, and the transistor 350 becomes turned off. As an example, at time $t_{22}$, the voltage 381 is larger than the threshold 783 as shown by the waveform 781, and the flyback switch-mode power converter 300 is not in the light load mode (LLM). For example, at time $t_{22}$, the signal 371 is at the logic low level as shown by the waveform 771. As an example, at time $t_{22}$, the drive voltage 335 is at the logic low level as shown by the waveform 735, and the transistor 360 is turned off.

From time $t_{22}$ to time $t_{23}$, the demagnetization signal 475 remains at the logic high level as shown by the waveform 775, indicating the primary winding 312 undergoes the demagnetization process according to some embodiments. For example, from time $t_{22}$ to time $t_{23}$, the drive voltage 351 remains at the logic low level as shown by the waveform 751, and the transistor 350 remains turned off. As an example, from time $t_{22}$ to time $t_{23}$, the voltage 381 remains larger than the threshold 783 as shown by the waveform 781, and the flyback switch-mode power converter 300 remains not in the light load mode (LLM). For example, from time $t_{22}$ to time $t_{23}$, the signal 371 remains at the logic low level as shown by the waveform 771. As an example, from time $t_{22}$ to time $t_{23}$, the drive voltage 335 remains at the logic low level as shown by the waveform 735, and the transistor 360 remains turned off.

At time $t_{23}$, the demagnetization signal 475 changes from the logic high level to the logic low level as shown by the waveform 775, indicating the demagnetization process of the primary winding 312 ends according to certain embodiments. For example, at time $t_{23}$, the drive voltage 351 is at the logic low level as shown by the waveform 751, and the transistor 350 is turned off. As an example, at time $t_{23}$, the voltage 381 is larger than the threshold 783 as shown by the waveform 781, and the flyback switch-mode power converter 300 is not in the light load mode (LLM). For example, at time $t_{23}$, the signal 371 is at the logic low level as shown by the waveform 771. As an example, at time $t_{23}$, the drive voltage 335 is at the logic low level as shown by the waveform 735, and the transistor 360 is turned off.

From time $t_{23}$ to time $t_{24}$, the demagnetization signal 475 remains at the logic low level as shown by the waveform 775, indicating the primary winding 312 does not undergo any demagnetization process according to certain embodiments. For example, from time $t_{23}$ to time $t_{24}$, the drive voltage 351 remains at the logic low level as shown by the waveform 751, and the transistor 350 remains turned off. As an example, from time $t_{23}$ to time $t_{24}$, the voltage 381 remains larger than the threshold 783 as shown by the waveform 781, and the flyback switch-mode power converter 300 remains not in the light load mode (LLM). For example, from time $t_{23}$ to time $t_{24}$, the signal 371 remains at the logic low level as shown by the waveform 771. As an example, from time $t_{23}$ to time $t_{24}$, the drive voltage 335 remains at the logic low level as shown by the waveform 735, and the transistor 360 remains turned off.

At time $t_{24}$, the signal 371 changes from the logic low level to the logic high level as shown by the waveform 771 according to some embodiments. For example, at time $t_{24}$, the drive voltage 335 changes from the logic low level to the logic high level as shown by the waveform 735, and the transistor 360 becomes turned on. As an example, at time $t_{24}$, the demagnetization signal 475 is at the logic low level as shown by the waveform 775, indicating the primary winding 312 does not undergo any demagnetization process. For example, at time $t_{24}$, the drive voltage 351 is at the logic low level as shown by the waveform 751, and the transistor 350 is turned off. As an example, at time $t_{24}$, the voltage 381 is larger than the threshold 783 as shown by the waveform 781, and the flyback switch-mode power converter 300 is not in the light load mode (LLM). In certain examples, the signal 371 changes from the logic low level to the logic high at time $t_{24}$ after the demagnetization process of the primary winding 312 ends at time $t_{23}$, and at time $t_{24}$, the controller chip 320 of the flyback switch-mode power converter 300 detects that the flyback switch-mode power converter 300 is in a discontinuous conduction mode (DCM). For example, before time $t_{24}$, at time $t_{21}$, the controller chip 320 of the flyback switch-mode power converter 300 detects that the flyback switch-mode power converter 300 exits the light load mode (LLM). As an example, at time $t_{24}$, the controller chip 320 of the flyback switch-mode power converter 300 determines that the flyback switch-mode power converter 300 operates in the discontinuous conduction mode (DCM) but not in the light load mode (LLM).

From time $t_{24}$ to time $t_{25}$, the signal 371 remains at the logic high level as shown by the waveform 771 according to certain embodiments. For example, from time $t_{24}$ to time $t_{25}$, the drive voltage 335 remains at the logic high level as shown by the waveform 735, and the transistor 360 remains turned on. As an example, from time $t_{24}$ to time $t_{25}$, the demagnetization signal 475 remains at the logic low level as shown by the waveform 775, indicating the primary winding 312 does not undergo any demagnetization process. For example, from time $t_{24}$ to time $t_{25}$, the drive voltage 351 remains at the logic low level as shown by the waveform 751, and the transistor 350 remains turned off. As an example, from time $t_{24}$ to time $t_{25}$, the voltage 381 remains larger than the threshold 783 as shown by the waveform 781, and the flyback switch-mode power converter 300 remains not in the light load mode (LLM).

At time $t_{25}$, the signal 371 changes from the logic high level to the logic low level as shown by the waveform 771 according to some embodiments. For example, at time $t_{25}$, the drive voltage 335 is at the logic high level as shown by the waveform 735, and the transistor 360 is turned on. As an example, at time $t_{25}$, the demagnetization signal 475 is at the logic low level as shown by the waveform 775, indicating the primary winding 312 does not undergo any demagnetization process. For example, at time $t_{25}$, the drive voltage 351 is at the logic low level as shown by the waveform 751, and the transistor 350 is turned off. As an example, at time $t_{25}$, the voltage 381 is larger than the threshold 783 as shown by the waveform 781, and the flyback switch-mode power converter 300 is not in the light load mode (LLM).

From time $t_{25}$ to time $t_{26}$, the signal 371 remains at the logic low level as shown by the waveform 771 according to certain embodiments. For example, from time $t_{25}$ to time $t_{26}$, the drive voltage 335 remains at the logic high level as shown by the waveform 735, and the transistor 360 remains turned on. As an example, from time $t_{25}$ to time $t_{26}$, the demagnetization signal 475 remains at the logic low level as shown by the waveform 775, indicating the primary winding 312 does not undergo any demagnetization process. For example, from time $t_{25}$ to time $t_{26}$, the drive voltage 351 remains at the logic low level as shown by the waveform 751, and the transistor 350 remain turned off. As an example, from time $t_{25}$ to time $t_{26}$, the voltage 381 is larger than the threshold 783 as shown by the waveform 781, and the flyback switch-mode power converter 300 is not in the light load mode (LLM).

At time $t_{26}$, the drive voltage 335 changes from the logic high level to the logic low level as shown by the waveform 735, and the transistor 360 becomes turned off according to some embodiments. For example, at time $t_{26}$, the signal 371 is at the logic low level as shown by the waveform 771. As an example, at time $t_{26}$, the demagnetization signal 475 is at the logic low level as shown by the waveform 775, indicating the primary winding 312 does not undergo any demagnetization process. For example, at time $t_{26}$, the drive voltage 351 is at the logic low level as shown by the waveform 751, and the transistor 350 is turned off. As an example, at time $t_{26}$, the voltage 381 is larger than the threshold 783 as shown by the waveform 781, and the flyback switch-mode power converter 300 is not in the light load mode (LLM).

From time $t_{26}$ to time $t_{27}$, the drive voltage 335 remains at the logic low level as shown by the waveform 735, and the transistor 360 remains turned off according to certain embodiments. For example, from time $t_{26}$ to time $t_{27}$, the signal 371 remains at the logic low level as shown by the waveform 771. As an example, from time $t_{26}$ to time $t_{27}$, the demagnetization signal 475 remains at the logic low level as shown by the waveform 775, indicating the primary winding 312 does not undergo any demagnetization process. For example, from time $t_{26}$ to time $t_{27}$, the drive voltage 351 remains at the logic low level as shown by the waveform 751, and the transistor 350 remains turned off. As an example, from time $t_{26}$ to time $t_{27}$, the voltage 381 remains larger than the threshold 783 as shown by the waveform 781, and the flyback switch-mode power converter 300 remains not in the light load mode (LLM).

At time $t_{27}$, the drive voltage 351 changes from the logic low level to the logic high level as shown by the waveform 751, and the transistor 350 becomes turned on according to some embodiments. For example, the drive voltage 335 is at the logic low level as shown by the waveform 735, and the transistor 360 is turned off. As an example, at time $t_{27}$, the signal 371 is at the logic low level as shown by the waveform 771. For example, at time $t_{27}$, the demagnetization signal 475 is at the logic low level as shown by the waveform 775, indicating the primary winding 312 does not undergo any demagnetization process. As an example, at time $t_{27}$, the voltage 381 is larger than the threshold 783 as shown by the waveform 781, and the flyback switch-mode power converter 300 is not in the light load mode (LLM).

From time $t_{27}$ to time $t_{28}$, the drive voltage 351 remains at the logic high level as shown by the waveform 751, and the transistor 350 remains turned on according to certain embodiments. For example, from time $t_{27}$ to time $t_{28}$, the drive voltage 335 remains at the logic low level as shown by the waveform 735, and the transistor 360 remains turned off. As an example, from time $t_{27}$ to time $t_{28}$, the signal 371 remains at the logic low level as shown by the waveform 771. For example, from time $t_{27}$ to time $t_{28}$, the demagnetization signal 475 remains at the logic low level as shown by the waveform 775, indicating the primary winding 312 does not undergo any demagnetization process. As an example, from time $t_{27}$ to time $t_{28}$, the voltage 381 remains larger than the threshold 783 as shown by the waveform 781, and the flyback switch-mode power converter 300 remains not in the light load mode (LLM).

At time $t_{28}$, the drive voltage 351 changes from the logic high level to the logic low level as shown by the waveform 751, and the transistor 350 becomes turned off according to some embodiments. For example, at time $t_{28}$, the drive voltage 335 is at the logic low level as shown by the waveform 735, and the transistor 360 is turned off. As an example, at time $t_{28}$, the signal 371 is at the logic low level as shown by the waveform 771. For example, at time $t_{28}$, the demagnetization signal 475 is at the logic low level as shown by the waveform 775, indicating the primary winding 312 does not undergo any demagnetization process. As an example, at time $t_{28}$, the voltage 381 is larger than the threshold 783 as shown by the waveform 781, and the flyback switch-mode power converter 300 is not in the light load mode (LLM).

According to certain embodiments, at time $t_{24}$, the controller chip 320 of the flyback switch-mode power converter 300 determines that the flyback switch-mode power converter 300 operates in the discontinuous conduction mode (DCM) but not in the light load mode (LLM). In some examples, when the flyback switch-mode power converter 300 operates in the discontinuous conduction mode (DCM) but not in the light load mode (LLM), during every switching cycle, the drive voltages 335 and 351 are generated to turn on the transistor 360 and then turn on the transistor 350 based at least in part on the signal 371. For example, at time $t_{24}$, in response to the signal 371 changing from the logic low level to the logic high level, the drive voltage 335 changes from the logic low level to the logic high level, and the transistor 360 becomes turned on. In certain examples, a predetermined duration after the drive voltage 335 changes from the logic high level to the logic low level at time $t_{26}$, the drive voltage 351 changes from the logic low level to the logic high level at time $t_{27}$. For example, time $t_{27}$ is equal to time $t_{26}$ plus the predetermined duration. As an example, from time $t_{26}$ to time $t_{27}$, both the drive voltage 335 and the drive voltage 351 are at the logic low level.

According to some embodiments, if the flyback switch-mode power converter operates in a discontinuous conduction mode (DCM) but not in a light load mode (LLM), the dead-time controller 174 generates the dead-time signal 175 based at least in part on the control signal 177 so that a predetermined duration after the transistor 360 becomes turned off, the transistor 350 becomes turned on. For example, the transistor 360 becomes turned off at time $t_{26}$, and the transistor 350 becomes turned on at time $t_{27}$. As an example, time $t_{27}$ is equal to time $t_{26}$ plus the predetermined duration. In certain examples, during the predetermined duration (e.g., from time $t_{26}$ to time $t_{27}$), both the transistors 350 and 360 are turned off.

Figure 8:
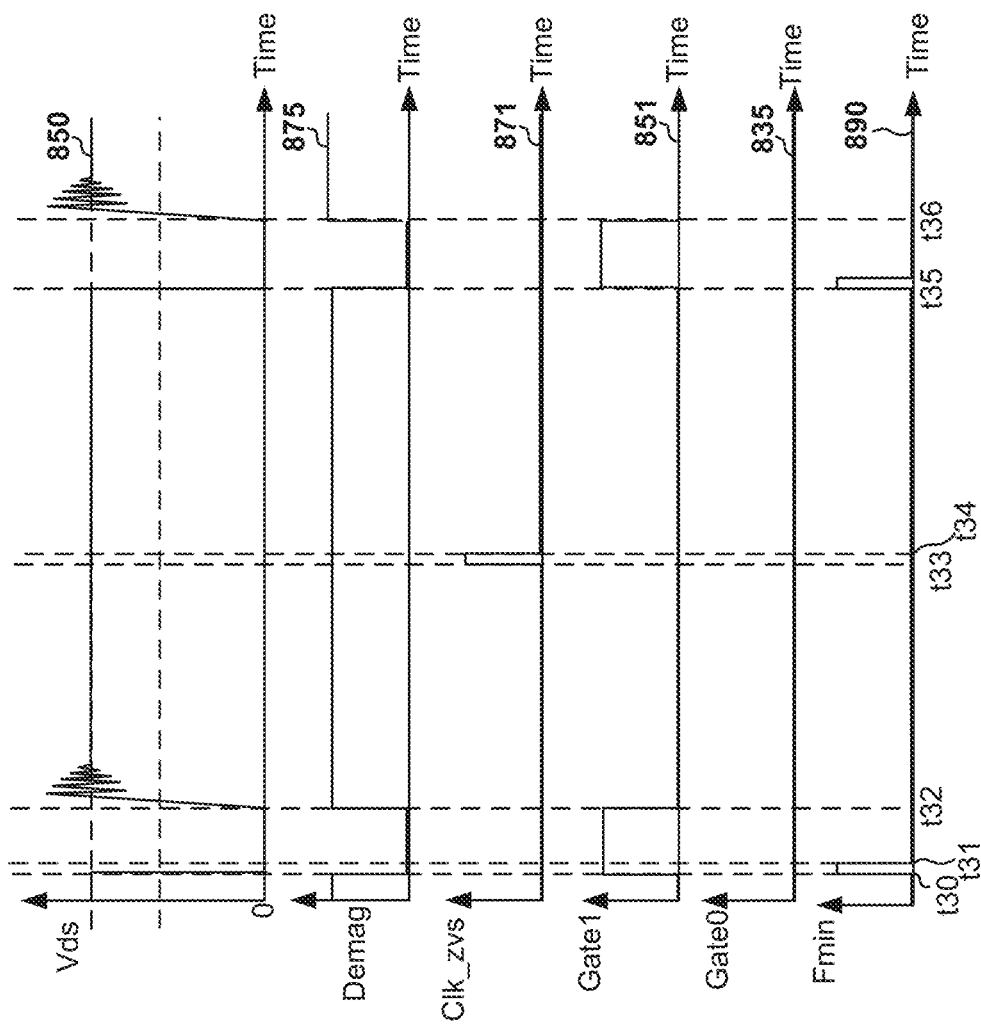
FIG. 8 shows simplified timing diagrams for the controller chip of the flyback switch-mode power converter as shown in FIG. 3 if the flyback switch-mode power converter operates in a continuous conduction mode (CCM) and a high AC voltage mode according to certain embodiments of the present invention.

FIG. 8 shows simplified timing diagrams for the controller chip 320 of the flyback switch-mode power converter 300 as shown in FIG. 3 if the flyback switch-mode power converter 300 operates in a continuous conduction mode (CCM) and a high AC voltage mode according to certain embodiments of the present invention. These diagrams are merely examples, which should not unduly limit the scope of the claims. One of ordinary skill in the art would recognize many variations, alternatives, and modifications. The waveform 850 represents the voltage drop from the drain terminal 354 to the source terminal 358 of the transistor 350 as a function of time, the waveform 875 represents the demagnetization signal 475 as a function of time, the waveform 871 represents the signal 371 as a function of time, the waveform 851 represents the drive voltage 351 as a function of time, the waveform 835 represents the drive voltage 335 as a function of time, and the waveform 890 represents, as a function of time, the signal that sets a minimum frequency for the operation frequency (e.g., the switching frequency) of the flyback switch-mode power converter 300.

At time $t_{30}$, the drive voltage 351 changes from a logic low level to a logic high level as shown by the waveform 851, and the transistor 350 becomes turned on according to certain embodiments. For example, at time $t_{30}$, the demagnetization signal 475 changes from the logic high level to the logic low level as shown by the waveform 875, indicating a demagnetization process of the primary winding 312 ends. As an example, at time $t_{30}$, the signal that sets a minimum frequency for the operation frequency (e.g., the switching frequency) of the flyback switch-mode power converter 300 changes from the logic low level to the logic high level as shown by the waveform 890. For example, at time $t_{30}$, the signal 371 is at the logic low level as shown by the waveform 871. As an example, at time $t_{30}$, the drive voltage 335 is at the logic low level as shown by the waveform 835, and the transistor 360 is turned off.

From time $t_{30}$ to time $t_{31}$, the drive voltage 351 remains at the logic high level as shown by the waveform 851, and the transistor 350 remains turned on according to some embodiments. For example, from time $t_{30}$ to time $t_{31}$, the demagnetization signal 475 remains at the logic low level as shown by the waveform 875, indicating the primary winding 312 does not undergo a demagnetization process. As an example, from time $t_{30}$ to time $t_{31}$, the signal that sets a minimum frequency for the operation frequency (e.g., the switching frequency) of the flyback switch-mode power converter 300 remains at the logic high level as shown by the waveform 890. For example, from time $t_{30}$ to time $t_{31}$, the signal 371 remains at the logic low level as shown by the waveform 871. As an example, from time $t_{30}$ to time $t_{31}$, the drive voltage 335 remains at the logic low level as shown by the waveform 835, and the transistor 360 remains turned off.

At time $t_{31}$, the signal that sets a minimum frequency for the operation frequency (e.g., the switching frequency) of the flyback switch-mode power converter 300 changes from the logic high level to the logic low level as shown by the waveform 890 according to certain embodiments. For example, at time $t_{31}$, the drive voltage 351 is at the logic high level as shown by the waveform 851, and the transistor 350 is turned on. As an example, at time $t_{31}$, the demagnetization signal 475 is at the logic low level as shown by the waveform 875, indicating the primary winding 312 does not undergo a demagnetization process. For example, at time $t_{31}$, the signal 371 is at the logic low level as shown by the waveform 871. As an example, at time $t_{31}$, the drive voltage 335 is at the logic low level as shown by the waveform 835, and the transistor 360 is turned off.

From time $t_{31}$ to time $t_{32}$, the signal that sets a minimum frequency for the operation frequency (e.g., the switching frequency) of the flyback switch-mode power converter 300 remains at the logic low level as shown by the waveform 890 according to some embodiments. For example, from time $t_{31}$ to time $t_{32}$, the drive voltage 351 remains at the logic high level as shown by the waveform 851, and the transistor 350 remains turned on. As an example, from time $t_{31}$ to time $t_{32}$, the demagnetization signal 475 remains at the logic low level as shown by the waveform 875, indicating the primary winding 312 does not undergo a demagnetization process. For example, from time $t_{31}$ to time $t_{32}$, the signal 371 remains at the logic low level as shown by the waveform 871. As an example, from time $t_{31}$ to time $t_{32}$, the drive voltage 335 remains at the logic low level as shown by the waveform 835, and the transistor 360 remains turned off.

At time $t_{32}$, the drive voltage 351 changes from the logic high level to the logic low level as shown by the waveform 851, and the transistor 350 becomes turned off according to certain embodiments. For example, at time $t_{32}$, the demagnetization signal 475 changes from the logic low level to the logic high level as shown by the waveform 875, indicating the primary winding 312 starts undergoing a demagnetization process. As an example, at time $t_{32}$, the signal that sets a minimum frequency for the operation frequency (e.g., the switching frequency) of the flyback switch-mode power converter 300 is at the logic low level as shown by the waveform 890. For example, at time $t_{32}$, the signal 371 is at the logic low level as shown by the waveform 871. As an example, at time $t_{32}$, the drive voltage 335 is at the logic low level as shown by the waveform 835, and the transistor 360 is turned off.

From time $t_{32}$ to time $t_{33}$, the drive voltage 351 remains at the logic low level as shown by the waveform 851, and the transistor 350 remains turned off according to some embodiments. For example, from time $t_{32}$ to time $t_{33}$, the signal that sets a minimum frequency for the operation frequency (e.g., the switching frequency) of the flyback switch-mode power converter 300 remains at the logic low level as shown by the waveform 890. As an example, from time $t_{32}$ to time $t_{33}$, the demagnetization signal 475 remains at the logic high level as shown by the waveform 875, indicating the primary winding 312 undergoes a demagnetization process. For example, from time $t_{32}$ to time $t_{33}$, the signal 371 remains at the logic low level as shown by the waveform 871. As an example, from time $t_{32}$ to time $t_{33}$, the drive voltage 335 remains at the logic low level as shown by the waveform 835, and the transistor 360 remains turned off.

At time $t_{33}$, the signal 371 changes from the logic low level to the logic high level as shown by the waveform 871 according to certain embodiments. For example, at time $t_{33}$, the drive voltage 351 is at the logic low level as shown by the waveform 851, and the transistor 350 is turned off. As an example, at time $t_{33}$, the signal that sets a minimum frequency for the operation frequency (e.g., the switching frequency) of the flyback switch-mode power converter 300 is at the logic low level as shown by the waveform 890. For example, at time $t_{33}$, the demagnetization signal 475 is at the logic high level as shown by the waveform 875, indicating the primary winding 312 undergoes a demagnetization process. As an example, at time $t_{33}$, the drive voltage 335 is at the logic low level as shown by the waveform 835, and the transistor 360 is turned off. In some examples, the signal 371 changes from the logic low level to the logic high level at time $t_{33}$ before the demagnetization process of the primary winding 312 ends at time $t_{35}$, and at time $t_{33}$, the controller chip 320 of the flyback switch-mode power converter 300 detects that the flyback switch-mode power converter 300 is in a continuous conduction mode (CCM). For example, the controller chip 320 of the flyback switch-mode power converter 300 also detects that the flyback switch-mode power converter 300 operates in a high AC voltage mode. As an example, at time $t_{33}$, the controller chip 320 of the flyback switch-mode power converter 300 determines that the flyback switch-mode power converter 300 operates in both the continuous conduction mode (CCM) and the high AC voltage mode.

From time $t_{33}$ to time $t_{34}$, the signal 371 remains at the logic high level as shown by the waveform 871 according to some embodiments. For example, from time $t_{33}$ to time 134, the drive voltage 351 remains at the logic low level as shown by the waveform 851, and the transistor 350 remains turned off. As an example, from time $t_{33}$ to time $t_{34}$, the signal that sets a minimum frequency for the operation frequency (e.g., the switching frequency) of the flyback switch-mode power converter 300 remains at the logic low level as shown by the waveform 890. For example, from time $t_{33}$ to time $t_{34}$, the demagnetization signal 475 remains at the logic high level as shown by the waveform 875, indicating the primary winding 312 undergoes a demagnetization process. As an example, from time $t_{33}$ to time $t_{34}$, the drive voltage 335 remains at the logic low level as shown by the waveform 835, and the transistor 360 remains turned off.

At time $t_{34}$, the signal 371 changes from the logic high level to the logic low level as shown by the waveform 871 according to certain embodiments. For example, at time $t_{34}$, the drive voltage 351 is at the logic low level as shown by the waveform 851, and the transistor 350 is turned off. As an example, at time $t_{34}$, the signal that sets a minimum frequency for the operation frequency (e.g., the switching frequency) of the flyback switch-mode power converter 300 is at the logic low level as shown by the waveform 890. For example, at time $t_{34}$, the demagnetization signal 475 is at the logic high level as shown by the waveform 875, indicating the primary winding 312 undergoes a demagnetization process. As an example, at time $t_{34}$, the drive voltage 335 is at the logic low level as shown by the waveform 835, and the transistor 360 is turned off.

From time $t_{34}$ to time $t_{35}$, the signal 371 remains at the logic low level as shown by the waveform 871 according to some embodiments. For example, from time $t_{34}$ to time $t_{35}$, the drive voltage 351 remains at the logic low level as shown by the waveform 851, and the transistor 350 remains turned off. As an example, from time $t_{34}$ to time $t_{35}$, the signal that sets a minimum frequency for the operation frequency (e.g., the switching frequency) of the flyback switch-mode power converter 300 remains at the logic low level as shown by the waveform 890. For example, from time $t_{34}$ to time $t_{35}$, the demagnetization signal 475 remains at the logic high level as shown by the waveform 875, indicating the primary winding 312 undergoes a demagnetization process. As an example, from time $t_{34}$ to time $t_{35}$, the drive voltage 335 remains at the logic low level as shown by the waveform 835, and the transistor 360 remains turned off.

At time $t_{35}$, the drive voltage 351 changes from the logic low level to the logic high level as shown by the waveform 851, and the transistor 350 becomes turned on according to certain embodiments. For example, at time $t_{35}$, the signal that sets a minimum frequency for the operation frequency (e.g., the switching frequency) of the flyback switch-mode power converter 300 changes from the logic low level to the logic high level as shown by the waveform 890. As an example, at time $t_{35}$, the demagnetization signal 475 changes from the logic high level to the logic low level as shown by the waveform 875, indicating the demagnetization process of the primary winding 312 ends. For example, at time $t_{35}$, the signal 371 is at the logic low level as shown by the waveform 871. As an example, at time $t_{35}$, the drive voltage 335 is at the logic low level as shown by the waveform 835, and the transistor 360 is turned off.

According to certain embodiments, at time $t_{33}$, the controller chip 320 of the flyback switch-mode power converter 300 determines that the flyback switch-mode power converter 300 operates in both the continuous conduction mode (CCM) and the high AC voltage mode. In some examples, when the flyback switch-mode power converter 300 operates in the continuous conduction mode (CCM) and the high AC voltage mode, during every switching cycle of the flyback switch-mode power converter 300, the drive voltage 335 is generated so that the transistor 360 remains turned off. In certain examples, when the flyback switch-mode power converter 300 operates in the continuous conduction mode (CCM) and the high AC voltage mode, during every switching cycle of the flyback switch-mode power converter 300, the drive voltage 351 is generated to turn on the transistor 350 based at least in part on the signal that sets a minimum frequency for the operation frequency (e.g., the switching frequency) of the flyback switch-mode power converter 300. For example, at time $t_{35}$, in response to the signal that sets a minimum frequency for the operation frequency (e.g., the switching frequency) of the flyback switch-mode power converter 300 changing from the logic low level to the logic high level, the drive voltage 351 changes from the logic low level to the logic high level, and the transistor 350 becomes turned on. As an example, from time $t_{35}$ to time $t_{36}$, the drive voltage 351 remains at the logic high level, and the transistor 350 remains turned on, wherein the time duration from time $t_{35}$ to time $t_{36}$ has a predetermined length.

Figure 9:
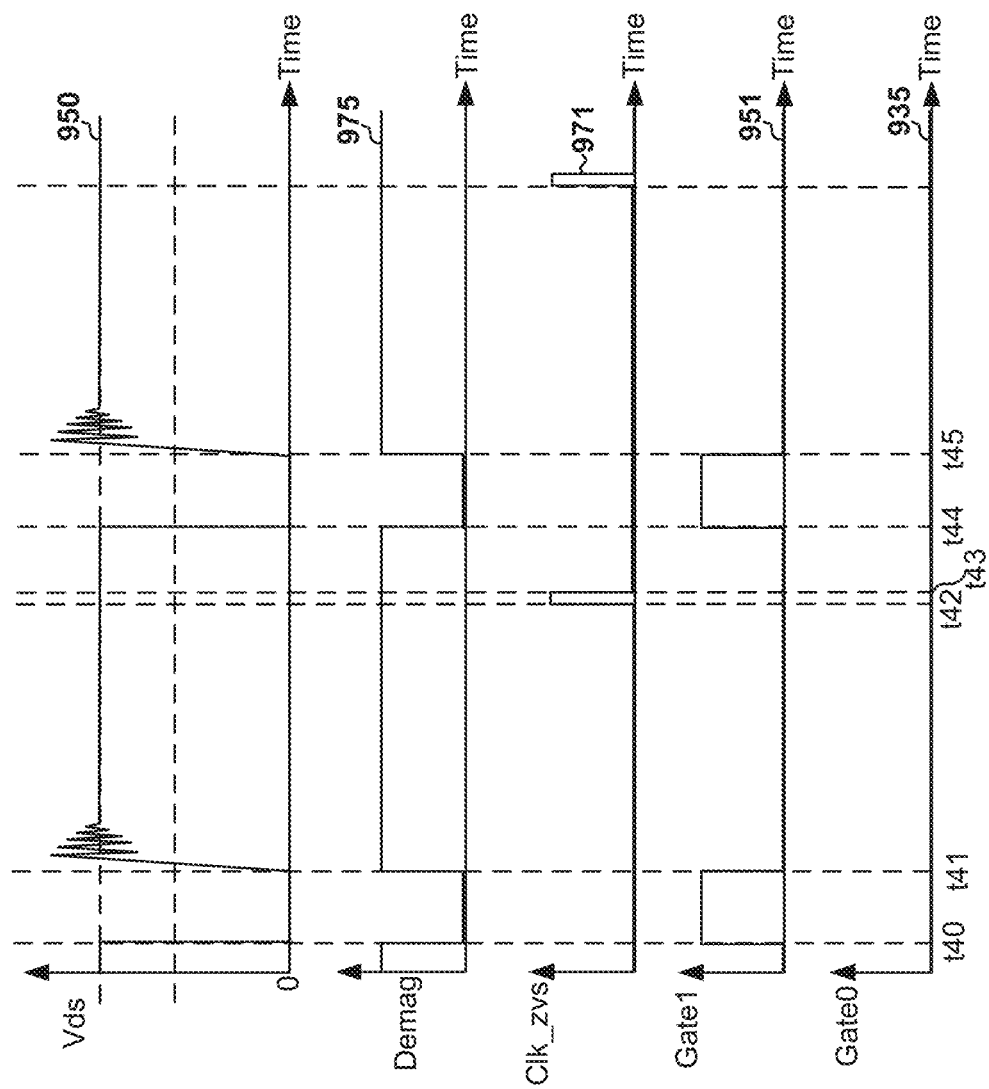
FIG. 9 shows simplified timing diagrams for the controller chip of the flyback switch-mode power converter as shown in FIG. 3 if the flyback switch-mode power converter operates in a continuous conduction mode (CCM) and a low AC voltage mode according to certain embodiments of the present invention.

FIG. 9 shows simplified timing diagrams for the controller chip 320 of the flyback switch-mode power converter 300 as shown in FIG. 3 if the flyback switch-mode power converter 300 operates in a continuous conduction mode (CCM) and a low AC voltage mode according to certain embodiments of the present invention. These diagrams are merely examples, which should not unduly limit the scope of the claims. One of ordinary skill in the art would recognize many variations, alternatives, and modifications. The waveform 950 represents the voltage drop from the drain terminal 354 to the source terminal 358 of the transistor 350 as a function of time, the waveform 975 represents the demagnetization signal 475 as a function of time, the waveform 971 represents the signal 371 as a function of time, and the waveform 951 represents the drive voltage 351 as a function of time, and the waveform 935 represents the drive voltage 335 as a function of time.

At time $t_{40}$, the drive voltage 351 changes from a logic low level to a logic high level as shown by the waveform 951, and the transistor 350 becomes turned on according to certain embodiments. For example, at time $t_{40}$, the demagnetization signal 475 changes from the logic high level to the logic low level as shown by the waveform 875, indicating a demagnetization process of the primary winding 312 ends. As an example, at time $t_{40}$, the signal 371 is at the logic low level as shown by the waveform 971. As an example, at time $t_{40}$, the drive voltage 335 is at the logic low level as shown by the waveform 935, and the transistor 360 is turned off.

From time $t_{40}$ to time $t_{41}$, the drive voltage 351 remains at the logic high level as shown by the waveform 951, and the transistor 350 remains turned on according to some embodiments. For example, from time $t_{40}$ to time $t_{41}$, the demagnetization signal 475 remains at the logic low level as shown by the waveform 975, indicating the primary winding 312 does not undergo a demagnetization process. As an example, from time $t_{40}$ to time $t_{41}$, the signal 371 remains at the logic low level as shown by the waveform 971. As an example, from time $t_{40}$ to time $t_{41}$, the drive voltage 335 remains at the logic low level as shown by the waveform 935, and the transistor 360 remains turned off.

At time $t_{41}$, the drive voltage 351 changes from the logic high level to the logic low level as shown by the waveform 951, and the transistor 350 becomes turned off according to certain embodiments. For example, at time $t_{41}$, the demagnetization signal 475 changes from the logic low level to the logic high level as shown by the waveform 975, indicating the primary winding 312 starts undergoing a demagnetization process. As an example, at time $t_{41}$, the signal 371 is at the logic low level as shown by the waveform 971. As an example, at time $t_{41}$, the drive voltage 335 is at the logic low level as shown by the waveform 935, and the transistor 360 is turned off.

From time $t_{41}$ to time $t_{42}$, the drive voltage 351 remains at the logic low level as shown by the waveform 951, and the transistor 350 remains turned off according to some embodiments. For example, from time $t_{41}$ to time $t_{42}$, the demagnetization signal 475 remains at the logic high level as shown by the waveform 975, indicating the primary winding 312 undergoes a demagnetization process. For example, from time $t_{41}$ to time $t_{42}$, the signal 371 remains at the logic low level as shown by the waveform 971. As an example, from time $t_{41}$ to time $t_{42}$, the drive voltage 335 remains at the logic low level as shown by the waveform 935, and the transistor 360 remains turned off.

At time $t_{42}$, the signal 371 changes from the logic low level to the logic high level as shown by the waveform 871 according to certain embodiments. For example, at time $t_{42}$, the drive voltage 351 is at the logic low level as shown by the waveform 951, and the transistor 350 is turned off. As an example, at time $t_{42}$, the demagnetization signal 475 is at the logic high level as shown by the waveform 975, indicating the primary winding 312 undergoes a demagnetization process. As an example, at time $t_{42}$, the drive voltage 335 is at the logic low level as shown by the waveform 935, and the transistor 360 is turned off. In some examples, the signal 371 changes from the logic low level to the logic high level at time $t_{42}$ before the demagnetization process of the primary winding 312 ends at time $t_{44}$, and at time $t_{42}$, the controller chip 320 of the flyback switch-mode power converter 300 detects that the flyback switch-mode power converter 300 is in a continuous conduction mode (CCM). For example, the controller chip 320 of the flyback switch-mode power converter 300 also detects that the flyback switch-mode power converter 300 operates in a low AC voltage mode. As an example, at time $t_{42}$, the controller chip 320 of the flyback switch-mode power converter 300 determines that the flyback switch-mode power converter 300 operates in both the continuous conduction mode (CCM) and the low AC voltage mode.

From time $t_{42}$ to time $t_{43}$, the signal 371 remains at the logic high level as shown by the waveform 971 according to some embodiments. For example, from time $t_{42}$ to time $t_{43}$, the drive voltage 351 remains at the logic low level as shown by the waveform 951, and the transistor 350 remains turned off. As an example, from time $t_{42}$ to time $t_{43}$, the demagnetization signal 475 remains at the logic high level as shown by the waveform 975, indicating the primary winding 312 undergoes a demagnetization process. For example, from time $t_{42}$ to time $t_{43}$, the drive voltage 335 remains at the logic low level as shown by the waveform 935, and the transistor 360 remains turned off.

At time $t_{43}$, the signal 371 changes from the logic high level to the logic low level as shown by the waveform 971 according to certain embodiments. For example, at time $t_{43}$, the drive voltage 351 is at the logic low level as shown by the waveform 951, and the transistor 350 is turned off. As an example, at time $t_{43}$, the demagnetization signal 475 is at the logic high level as shown by the waveform 975, indicating the primary winding 312 undergoes a demagnetization process. For example, at time $t_{43}$, the drive voltage 335 is at the logic low level as shown by the waveform 935, and the transistor 360 is turned off.

From time $t_{43}$ to time $t_{44}$, the signal 371 remains at the logic low level as shown by the waveform 971 according to some embodiments. For example, from time $t_{43}$ to time $t_{44}$, the drive voltage 351 remains at the logic low level as shown by the waveform 951, and the transistor 350 remains turned off. As an example, from time $t_{43}$ to time $t_{44}$, the demagnetization signal 475 remains at the logic high level as shown by the waveform 975, indicating the primary winding 312 undergoes a demagnetization process. As an example, from time $t_{43}$ to time $t_{44}$, the drive voltage 335 remains at the logic low level as shown by the waveform 935, and the transistor 360 remains turned off.

At time $t_{44}$, the drive voltage 351 changes from the logic low level to the logic high level as shown by the waveform 951, and the transistor 350 becomes turned on according to certain embodiments. For example, at time $t_{44}$, the demagnetization signal 475 changes from the logic high level to the logic low level as shown by the waveform 975, indicating the demagnetization process of the primary winding 312 ends. For example, at time $t_{44}$, the signal 371 is at the logic low level as shown by the waveform 971. As an example, at time $t_{44}$, the drive voltage 335 is at the logic low level as shown by the waveform 935, and the transistor 360 is turned off.

From time $t_{44}$ to time $t_{45}$, the drive voltage 351 remains at the logic high level as shown by the waveform 951, and the transistor 350 remains turned on according to some embodiments. For example, from time $t_{44}$ to time $t_{45}$, the demagnetization signal 475 remains at the logic low level as shown by the waveform 975, indicating the primary winding 312 does not undergo a demagnetization process. As an example, from time $t_{44}$ to time $t_{45}$, the signal 371 remains at the logic low level as shown by the waveform 971. For example, from time $t_{44}$ to time $t_{45}$, the drive voltage 335 remains at the logic low level as shown by the waveform 935, and the transistor 360 is turned off.

At time $t_{45}$, the drive voltage 351 changes from the logic high level to the logic low level as shown by the waveform 951, and the transistor 350 becomes turned off according to certain embodiments. For example, at time $t_{45}$, the demagnetization signal 475 changes from the logic low level to the logic high level as shown by the waveform 975, indicating the primary winding 312 starts undergoing a demagnetization process. As an example, at time $t_{45}$, the signal 371 is at the logic low level as shown by the waveform 971. As an example, at time $t_{45}$, the drive voltage 335 is at the logic low level as shown by the waveform 935, and the transistor 360 is turned off.

According to certain embodiments, at time $t_{42}$, the controller chip 320 of the flyback switch-mode power converter 300 determines that the flyback switch-mode power converter 300 operates in both the continuous conduction mode (CCM) and the low AC voltage mode. In some examples, when the flyback switch-mode power converter 300 operates in the continuous conduction mode (CCM) and the low AC voltage mode, during every switching cycle of the flyback switch-mode power converter 300, the drive voltage 335 is generated so that the transistor 360 remains turned off. In certain examples, when the flyback switch-mode power converter 300 operates in the continuous conduction mode (CCM) and the low AC voltage mode, during every switching cycle of the flyback switch-mode power converter 300, the drive voltage 351 is generated to turn on the transistor 350 based at least in part on the signal 371. For example, a predetermined duration after the signal 371 changes from the logic low level to the logic high level at time $t_{42}$, the drive voltage 351 changes from the logic low level to the logic high level and the transistor 350 becomes turned on at time $t_{44}$. As an example, time $t_{44}$ is equal to time $t_{42}$ plus the predetermined duration. In some examples, from time $t_{44}$ to time $t_{45}$, the drive voltage 351 remains at the logic high level, and the transistor 350 remains turned on, wherein the time duration from time $t_{44}$ to time $t_{45}$ has a predetermined length.

FIG. 10 is a simplified diagram showing a method for the flyback switch-mode power converter 300 as shown in FIG. 3 according to certain embodiments of the present invention. This diagram is merely an example, which should not unduly limit the scope of the claims. One of ordinary skill in the art would recognize many variations, alternatives, and modifications. The method 1000 for the flyback switch-mode power converter 300 includes a process 1010 for determining a mode of operation for the flyback switch-mode power converter 300, a process 1020 for generating the drive voltage 335, and a process 1030 for generating the drive voltage 351. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification.

At the process 1010, the mode of operation for the flyback switch-mode power converter 300 is determined according to some embodiments. For example, the mode detector 470 determines the mode of operation for the flyback switch-mode power converter 300 based at least in part on the voltage 341, the voltage 381, and the signal 471. As an example, the mode detector 470 determines the mode of operation for the flyback switch-mode power converter 300 based at least in part on the voltage 341, the voltage 381, the signal 471, and/or the signal 371.

At the process 1020, the drive voltage 335 is generated to turn on and/or turn off the transistor 360 according to certain embodiments. In some examples, the controller chip 320, based at least in part on the determined mode of operation, determines whether the transistor 360 remains turned off or becomes turned on during a switching cycle of the flyback switch-mode power converter 300. For example, if the determined mode of operation indicates that the flyback switch-mode power converter 300 operates in a discontinuous conduction mode (DCM) and a light load mode (LLM), the transistor 360 remains turned off throughout the entire switching cycle. As an example, if the determined mode of operation indicates that the flyback switch-mode power converter 300 operates in a continuous conduction mode (CCM) and a high AC voltage mode, the transistor 360 remains turned off throughout the entire switching cycle. For example, if the determined mode of operation indicates that the flyback switch-mode power converter 300 operates in a continuous conduction mode (CCM) and a low AC voltage mode, the transistor 360 remains turned off throughout the entire switching cycle. As an example, if the determined mode of operation indicates that the flyback switch-mode power converter 300 operates in a discontinuous conduction mode (DCM) but not in a light load mode (LLM), the transistor 360 becomes turned on during the switching cycle.

At the process 1030, the drive voltage 351 is generated to turn on and/or turn off the transistor 350 according to certain embodiments. In some examples, the controller chip 320, based at least in part on the determined mode of operation, generates the drive voltage 351 to turn on and/or turn off the transistor 350. For example, when the flyback switch-mode power converter 300 operates in a discontinuous conduction mode (DCM) and a light load mode (LLM), during every switching cycle of the flyback switch-mode power converter 300, the drive voltage 335 is generated so that the transistor 360 remains turned off, and the drive voltage 351 is generated to turn on the transistor 350 based at least in part on the signal 371. As an example, when the flyback switch-mode power converter 300 operates in a discontinuous conduction mode (DCM) but not in a light load mode (LLM), during every switching cycle of the flyback switch-mode power converter 300, the drive voltages 335 and 351 are generated to turn on the transistor 360 and then turn on the transistor 350 based at least in part on the signal 371. For example, when the flyback switch-mode power converter 300 operates in a continuous conduction mode (CCM) and a high AC voltage mode, during every switching cycle of the flyback switch-mode power converter 300, the drive voltage 335 is generated so that the transistor 360 remains turned off, and the drive voltage 351 is generated to turn on the transistor 350 based at least in part on the signal that sets a minimum frequency for the operation frequency (e.g., the switching frequency) of the flyback switch-mode power converter 300. As an example, when the flyback switch-mode power converter 300 operates in a continuous conduction mode (CCM) and a low AC voltage mode, during every switching cycle of the flyback switch-mode power converter 300, the drive voltage 335 is generated so that the transistor 360 remains turned off, and the drive voltage 351 is generated to turn on the transistor 350 based at least in part on the signal 371.

Some embodiments of the present invention provide the flyback switch-mode power converter 300 that does not turn on the transistor 360 in every switching cycle when the flyback switch-mode power converter 300 is in certain modes of operation. For example, when the flyback switch-mode power converter 300 operates in a discontinuous conduction mode (DCM) and a light load mode (LLM), during every switching cycle of the flyback switch-mode power converter 300, the transistor 360 remains turned off and is not turned on. As an example, when the flyback switch-mode power converter 300 operates in a continuous conduction mode (CCM) and a high AC voltage mode, during every switching cycle of the flyback switch-mode power converter 300, the transistor 360 remains turned off and is not turned on. For example, when the flyback switch-mode power converter 300 operates in a continuous conduction mode (CCM) and a low AC voltage mode, during every switching cycle of the flyback switch-mode power converter 300, the transistor 360 remains turned off and is not turned on.

Certain embodiments of the present invention provide a flyback switch-mode power converter that can reduce the standby power consumption and/or the light-load power consumption when the flyback switch-mode power converter operates in a light load mode (LLM). Some embodiments of the present invention provide a flyback switch-mode power converter that can prevent turning off a transistor prematurely (e.g., too early) when the flyback switch-mode power converter 100 operates in a continuous conduction mode (CCM).

According to certain embodiments, a controller for a power converter includes: a mode detector configured to determine a mode of operation for the power converter; a first gate driver configured to output a first drive voltage to a first transistor related to a first auxiliary winding coupled to a primary winding, a secondary winding, and a second auxiliary winding; a second gate driver configured to output a second drive voltage to a second transistor related to the primary winding; wherein the first gate driver is further configured to, if the mode of operation satisfies one or more first predetermined conditions, generate the first drive voltage so that the first transistor remains turned off during a switching cycle of the power converter; and if the mode of operation satisfies one or more second predetermined conditions, generate the first drive voltage so that the first transistor becomes turned on during the switching cycle of the power converter. For example, the controller is implemented according to at least FIG. 3.

As an example, the first gate driver is further configured to, if the mode of operation satisfies the one or more first predetermined conditions, generate the first drive voltage so that the first transistor remains turned off during every switching cycle of the power converter; and if the mode of operation satisfies the one or more second predetermined conditions, generate the first drive voltage so that the first transistor becomes turned on during every switching cycle of the power converter. For example, the mode of operation satisfies the one or more first predetermined conditions if the power converter operates in a discontinuous conduction mode and a light load mode. As an example, the mode of operation satisfies the one or more first predetermined conditions if the power converter operates in a continuous conduction mode and a high AC voltage mode. For example, the mode of operation satisfies the one or more first predetermined conditions if the power converter operates in a continuous conduction mode and a low AC voltage mode. As an example, the mode of operation satisfies the one or more second predetermined conditions if the power converter operates in a discontinuous conduction mode but not in a light load mode.

For example, the mode detector is further configured to determine whether the power converter operates in a discontinuous conduction mode or a continuous conduction mode. As an example, the mode detector is further configured to: receive a first input signal for representing a demagnetization process of the primary winding; receive a second input signal for setting a maximum frequency for an operation frequency of the power converter; and determine whether the power converter operates in the discontinuous conduction mode or the continuous conduction mode based at least in part on the first input signal and the second input signal. For example, the mode detector is further configured to determine whether or not the power converter operates in a light load mode. As an example, the mode detector is further configured to: receive an input signal for representing an output current related to the secondary winding; and determine whether or not the power converter operates in the light load mode based at least in part on the input signal. For example, the mode detector is further configured to determine whether the power converter operates in a high AC voltage mode or a low AC voltage mode. As an example, the mode detector is further configured to: receive an input signal for representing a peak magnitude of an AC voltage related to the primary winding; and determine whether the power converter operates in a high AC voltage mode or a low AC voltage mode based at least in part on the input signal.

For example, the mode detector includes: a voltage detector configured to generate a first logic signal indicating whether the power converter operates in a high AC voltage mode or a low AC voltage mode; a demagnetization detector configured to generate a second logic signal indicating whether a demagnetization process of the primary winding has ended; and a mode determination unit configured to receive the first logic signal and the second logic signal and determine the mode of operation for the power converter based at least in part on the first logic signal and the second logic signal. As an example, the mode determination unit is further configured to: receive a first input signal for representing an output current related to the secondary winding; receiver a second input signal for representing a peak magnitude of an AC voltage related to the primary winding; and determine the mode of operation for the power converter based at least in part on the first logic signal, the second logic signal, the first input signal and the second input signal. For example, the voltage detector is further configured to: receive an input signal for representing a peak magnitude of an AC voltage related to the primary winding; and generate the first logic signal indicating whether the power converter operates in the high AC voltage mode or the low AC voltage mode based at least in part on the input signal. As an example, the demagnetization detector is further configured to: receive an input signal for representing a demagnetization process of the primary winding; and generate the second logic signal indicating whether the demagnetization process of the primary winding has ended based at least in part on the input signal.

For example, the second gate driver is further configured to output the second drive voltage to turn on the second transistor during the switching cycle of the power converter, regardless of the mode of operation. As an example, the second gate driver is further configured to output the second drive voltage to turn on the second transistor during every switching cycle of the power converter, regardless of the mode of operation.

According to some embodiments, a controller for a power converter includes: a mode detector configured to determine a mode of operation for the power converter; a first gate driver configured to output a first drive voltage to a first transistor related to an auxiliary winding coupled to a primary winding and a secondary winding; and a second gate driver configured to output a second drive voltage to a second transistor related to the primary winding; wherein the first gate driver is further configured to, if the mode of operation satisfies one or more first predetermined conditions, generate the first drive voltage so that the first transistor remains turned off during every switching cycle of the power converter; and if the mode of operation satisfies one or more second predetermined conditions, generate the first drive voltage so that the first transistor becomes turned on during every switching cycle of the power converter; wherein the mode detector is further configured to: determine whether the power converter operates in a discontinuous conduction mode or a continuous conduction mode; determine whether or not the power converter operates in a light load mode; and determine whether the power converter operates in a high AC voltage mode or a low AC voltage mode. For example, the controller is implemented according to at least FIG. 3.

According to certain embodiments, a method for a power converter includes: determining a mode of operation for the power converter; outputting a first drive voltage to a first transistor related to a first auxiliary winding coupled to a primary winding, a secondary winding, and a second auxiliary winding; and outputting a second drive voltage to a second transistor related to the primary winding; wherein the outputting a first drive voltage to a first transistor includes: if the mode of operation satisfies one or more first predetermined conditions, generating the first drive voltage so that the first transistor remains turned off during a switching cycle of the power converter; and if the mode of operation satisfies one or more second predetermined conditions, generating the first drive voltage so that the first transistor becomes turned on during the switching cycle of the power converter. For example, the method is implemented according to at least FIG. 3.

As an example, the outputting a first drive voltage to a first transistor further includes: if the mode of operation satisfies the one or more first predetermined conditions, generating the first drive voltage so that the first transistor remains turned off during every switching cycle of the power converter; and if the mode of operation satisfies the one or more second predetermined conditions, generate the first drive voltage so that the first transistor becomes turned on during every switching cycle of the power converter. For example, the mode of operation satisfies the one or more first predetermined conditions if the power converter operates in a discontinuous conduction mode and a light load mode. As an example, the mode of operation satisfies the one or more first predetermined conditions if the power converter operates in a continuous conduction mode and a high AC voltage mode. For example, the mode of operation satisfies the one or more first predetermined conditions if the power converter operates in a continuous conduction mode and a low AC voltage mode. As an example, the mode of operation satisfies the one or more second predetermined conditions if the power converter operates in a discontinuous conduction mode but not in a light load mode. For example, the outputting a second drive voltage to a second transistor includes outputting the second drive voltage to turn on the second transistor during the switching cycle of the power converter, regardless of the mode of operation. As an example, the outputting a second drive voltage to a second transistor further includes outputting the second drive voltage to turn on the second transistor during every switching cycle of the power converter, regardless of the mode of operation.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a power converter, the controller comprising:
    a mode detector configured to determine a mode of operation for the power converter;
    a first gate driver configured to output a first drive voltage to a first transistor related to a first auxiliary winding coupled to a primary winding, a secondary winding, and a second auxiliary winding; and
    a second gate driver configured to output a second drive voltage to a second transistor related to the primary winding;
    wherein the first gate driver is further configured to,
        if the mode of operation satisfies one or more first predetermined conditions, generate the first drive voltage so that the first transistor remains turned off during a switching cycle of the power converter; and
        if the mode of operation satisfies one or more second predetermined conditions, generate the first drive voltage so that the first transistor becomes turned on during the switching cycle of the power converter.

2. The controller of claim 1 wherein the first gate driver is further configured to,
    if the mode of operation satisfies the one or more first predetermined conditions, generate the first drive voltage so that the first transistor remains turned off during every switching cycle of the power converter; and
    if the mode of operation satisfies the one or more second predetermined conditions, generate the first drive voltage so that the first transistor becomes turned on during every switching cycle of the power converter.

3. The controller of claim 1 wherein the mode of operation satisfies the one or more first predetermined conditions if the power converter operates in a discontinuous conduction mode and a light load mode.

4. The controller of claim 1 wherein the mode of operation satisfies the one or more first predetermined conditions if the power converter operates in a continuous conduction mode and a high AC voltage mode.

5. The controller of claim 1 wherein the mode of operation satisfies the one or more first predetermined conditions if the power converter operates in a continuous conduction mode and a low AC voltage mode.

6. The controller of claim 1 wherein the mode of operation satisfies the one or more second predetermined conditions if the power converter operates in a discontinuous conduction mode but not in a light load mode.

7. The controller of claim 1 wherein the mode detector is further configured to determine whether the power converter operates in a discontinuous conduction mode or a continuous conduction mode.

8. The controller of claim 7 wherein the mode detector is further configured to:
    receive a first input signal for representing a demagnetization process of the primary winding;
    receive a second input signal for setting a maximum frequency for an operation frequency of the power converter; and
    determine whether the power converter operates in the discontinuous conduction mode or the continuous conduction mode based at least in part on the first input signal and the second input signal.

9. The controller of claim 1 wherein the mode detector is further configured to determine whether or not the power converter operates in a light load mode.

10. The controller of claim 9 wherein the mode detector is further configured to:
    receive an input signal for representing an output current related to the secondary winding; and
    determine whether or not the power converter operates in the light load mode based at least in part on the input signal.

11. The controller of claim 1 wherein the mode detector is further configured to determine whether the power converter operates in a high AC voltage mode or a low AC voltage mode.

12. The controller of claim 11 wherein the mode detector is further configured to:
    receive an input signal for representing a peak magnitude of an AC voltage related to the primary winding; and determine whether the power converter operates in a high AC voltage mode or a low AC voltage mode based at least in part on the input signal.

13. The controller of claim 1 wherein the mode detector includes:
   a voltage detector configured to generate a first logic signal indicating whether the power converter operates in a high AC voltage mode or a low AC voltage mode;
   a demagnetization detector configured to generate a second logic signal indicating whether a demagnetization process of the primary winding has ended; and
   a mode determination unit configured to receive the first logic signal and the second logic signal and determine the mode of operation for the power converter based at least in part on the first logic signal and the second logic signal.

14. The controller of claim 13 wherein the mode determination unit is further configured to:
   receive a first input signal for representing an output current related to the secondary winding;
   receiver a second input signal for representing a peak magnitude of an AC voltage related to the primary winding; and
   determine the mode of operation for the power converter based at least in part on the first logic signal, the second logic signal, the first input signal and the second input signal.

15. The controller of claim 13 wherein the voltage detector is further configured to:
   receive an input signal for representing a peak magnitude of an AC voltage related to the primary winding; and
   generate the first logic signal indicating whether the power converter operates in the high AC voltage mode or the low AC voltage mode based at least in part on the input signal.

16. The controller of claim 13 wherein the demagnetization detector is further configured to:
   receive an input signal for representing a demagnetization process of the primary winding; and
   generate the second logic signal indicating whether the demagnetization process of the primary winding has ended based at least in part on the input signal.

17. The controller of claim 1 wherein the second gate driver is further configured to output the second drive voltage to turn on the second transistor during the switching cycle of the power converter, regardless of the mode of operation.

18. The controller of claim 17 wherein the second gate driver is further configured to output the second drive voltage to turn on the second transistor during every switching cycle of the power converter, regardless of the mode of operation.

19. A controller for a power converter, the controller comprising:
   a mode detector configured to determine a mode of operation for the power converter;
   a first gate driver configured to output a first drive voltage to a first transistor related to an auxiliary winding coupled to a primary winding and a secondary winding; and
   a second gate driver configured to output a second drive voltage to a second transistor related to the primary winding;
   wherein the first gate driver is further configured to,
      if the mode of operation satisfies one or more first predetermined conditions, generate the first drive voltage so that the first transistor remains turned off during every switching cycle of the power converter; and
      if the mode of operation satisfies one or more second predetermined conditions, generate the first drive voltage so that the first transistor becomes turned on during every switching cycle of the power converter;
   wherein the mode detector is further configured to:
      determine whether the power converter operates in a discontinuous conduction mode or a continuous conduction mode;
      determine whether or not the power converter operates in a light load mode; and
      determine whether the power converter operates in a high AC voltage mode or a low AC voltage mode.

20. A method for a power converter, the method comprising:
   determining a mode of operation for the power converter;
   outputting a first drive voltage to a first transistor related to a first auxiliary winding coupled to a primary winding, a secondary winding, and a second auxiliary winding; and
   outputting a second drive voltage to a second transistor related to the primary winding;
   wherein the outputting a first drive voltage to a first transistor includes:
      if the mode of operation satisfies one or more first predetermined conditions, generating the first drive voltage so that the first transistor remains turned off during a switching cycle of the power converter; and
      if the mode of operation satisfies one or more second predetermined conditions, generating the first drive voltage so that the first transistor becomes turned on during the switching cycle of the power converter.

21. The method of claim 20 wherein the outputting a first drive voltage to a first transistor further includes:
   if the mode of operation satisfies the one or more first predetermined conditions, generating the first drive voltage so that the first transistor remains turned off during every switching cycle of the power converter; and
   if the mode of operation satisfies the one or more second predetermined conditions, generate the first drive voltage so that the first transistor becomes turned on during every switching cycle of the power converter.

22. The method of claim 20 wherein the mode of operation satisfies the one or more first predetermined conditions if the power converter operates in a discontinuous conduction mode and a light load mode.

23. The method of claim 20 wherein the mode of operation satisfies the one or more first predetermined conditions if the power converter operates in a continuous conduction mode and a high AC voltage mode.

24. The method of claim 20 wherein the mode of operation satisfies the one or more first predetermined conditions if the power converter operates in a continuous conduction mode and a low AC voltage mode.

25. The method of claim 20 wherein the mode of operation satisfies the one or more second predetermined conditions if the power converter operates in a discontinuous conduction mode but not in a light load mode.

26. The method of claim 20 wherein the outputting a second drive voltage to a second transistor includes outputting the second drive voltage to turn on the second transistor during the switching cycle of the power converter, regardless of the mode of operation.

27. The method of claim 26 wherein the outputting a second drive voltage to a second transistor further includes outputting the second drive voltage to turn on the second transistor during every switching cycle of the power converter, regardless of the mode of operation.

* * * * *